(12) United States Patent
Yoo et al.

(10) Patent No.: US 8,516,369 B2
(45) Date of Patent: Aug. 20, 2013

(54) METHOD FOR PROVIDING GUI USING POINTER WITH SENSUOUS EFFECT THAT POINTER IS MOVED BY GRAVITY AND ELECTRONIC APPARATUS THEREOF

(75) Inventors: Ho-june Yoo, Seoul (KR); Sang-on Choi, Suwon-si (KR); Byung-seok Soh, Hwaseong-si (KR); Eun-seok Choi, Anyang-si (KR); Jong-hyuk Jang, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 669 days.

(21) Appl. No.: 12/626,431

(22) Filed: Nov. 25, 2009

(65) Prior Publication Data

US 2010/0169773 A1 Jul. 1, 2010

(30) Foreign Application Priority Data

Dec. 30, 2008 (KR) ........................ 10-2008-0136616

(51) Int. Cl.
*G06F 3/01* (2006.01)
(52) U.S. Cl.
USPC ............................ 715/702; 715/862; 715/863
(58) Field of Classification Search
USPC ................... 715/860, 862, 858, 702
See application file for complete search history.

(56) References Cited

U.S. PATENT DOCUMENTS

| | | | |
|---|---|---|---|
| 5,223,828 A * | 6/1993 | McKiel, Jr. .................. 340/4.14 |
| 5,448,261 A | 9/1995 | Koike et al. | |
| 5,825,308 A | 10/1998 | Rosenberg | |
| 5,917,486 A | 6/1999 | Rylander | |
| 5,963,191 A * | 10/1999 | Jaaskelainen, Jr. ........... 715/856 |
| 6,031,531 A * | 2/2000 | Kimble ......................... 715/862 |
| 6,046,722 A * | 4/2000 | McKiel, Jr. ................... 715/862 |
| 6,259,382 B1 * | 7/2001 | Rosenberg ..................... 341/20 |
| 6,466,199 B2 | 10/2002 | Takase et al. | |
| 7,168,042 B2 | 1/2007 | Braun et al. | |
| 7,404,149 B2 * | 7/2008 | Fox et al. ..................... 715/810 |
| 7,509,593 B2 * | 3/2009 | Kaminagayoshi ............ 715/862 |
| 7,523,418 B2 * | 4/2009 | Trewin ......................... 715/858 |
| 7,532,912 B2 * | 5/2009 | Nakayama ..................... 455/566 |
| 2005/0022137 A1 * | 1/2005 | Fushikida ..................... 715/823 |
| 2007/0152962 A1 * | 7/2007 | Kim et al. ..................... 345/156 |
| 2008/0270931 A1 | 10/2008 | Bamford | |
| 2009/0015550 A1 * | 1/2009 | Koski ............................ 345/157 |

FOREIGN PATENT DOCUMENTS

| | | | |
|---|---|---|---|
| EP | 1598733 A2 | 11/2005 |
| WO | 00/67245 A1 | 11/2000 |
| WO | 02/057885 A2 | 7/2002 |

OTHER PUBLICATIONS

Communication from the European Patent Office issued Feb. 3, 2012 in counterpart European Application No. 09177455.4.
Communication, dated Apr. 10, 2012, issued by the US Patent and Trademark Office in U.S. Appl. No. 12/639,532.

* cited by examiner

*Primary Examiner* — Omar Abdul-Ali
(74) *Attorney, Agent, or Firm* — Sughrue Mion, PLLC

(57) ABSTRACT

A method for providing a GUI which uses a pointer with a sensuous effect showing that the pointer is moved by gravity is provided. The GUI providing method moves a pointer toward a specific position of a GUI-component if the pointer enters the GUI-component, and outputs at least one of an auditory effect and a tactile effect while the pointer moves toward the specific position. Accordingly, the user moves the pointer to the GUI-component more easily and enjoys entertainment.

25 Claims, 28 Drawing Sheets

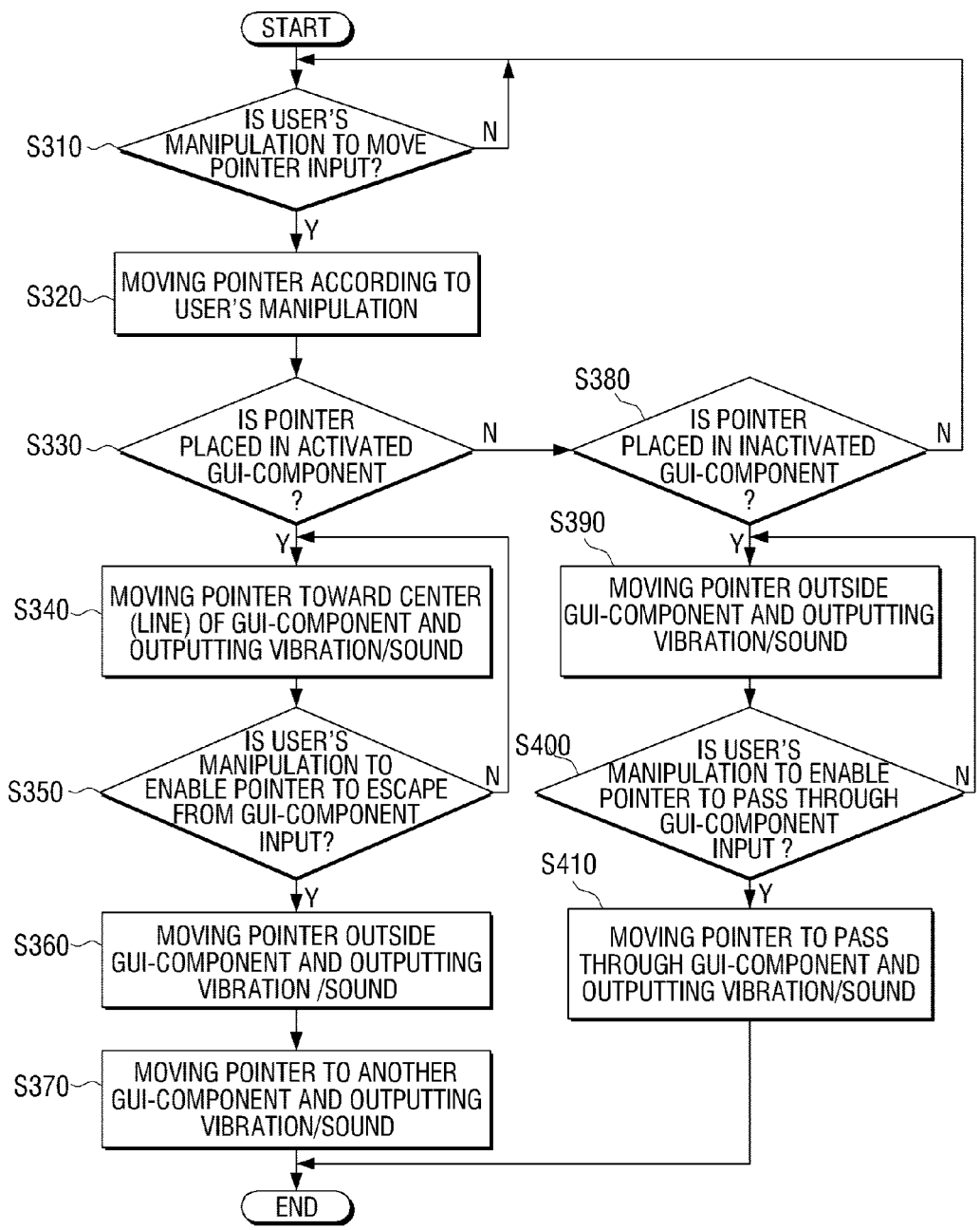

METHOD FOR PROVIDING GUI USING POINTER WITH SENSUOUS EFFECT THAT POINTER IS MOVED BY GRAVITY AND ELECTRONIC APPARATUS THEREOF

CROSS-REFERENCE TO RELATED APPLICATIONS

This application claims priority from Korean Patent Application No. 10-2008-136616, filed on Dec. 30, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a graphical user interface (GUI), and more particularly, to providing a GUI which allows a user to select a desired GUI-component using a pointer.

2. Description of the Related Art

A GUI through which a user selects a GUI-component such as an icon or a menu displayed on a display using a pointer was already widespread. In order to input a command under such a GUI environment, a user moves a pointer to a desired GUI-component using an input device such as a mouse or a touch pad, and commands a function allocated to the GUI-component on which the pointer is placed to be executed by pressing a specific button provided on the input device or touching the touch pad.

However, it may be inconvenient for a user to move the pointer to a desired GUI-component using the input device, in particular, if the size of the display is big and the size of the GUI-component is small.

The user demands a more convenient way of manipulating the GUI. Therefore, there is a demand for a method for a user to move a pointer to a desired GUI-component more easily.

Also, the GUI serves as not only a means for receiving a command from a user but also a means for giving a user amusement. Therefore, a product adopting a GUI which can provide a user with much amusement is prevailing in the current market. Accordingly, there is a demand for a method for increasing amusement of the user through the GUI.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for providing a GUI which uses a pointer with a sensuous effect showing that the pointer is moved by gravity on a display, thereby allowing a user to move the pointer to a desired GUI-component more easily, more entertainingly, and more realistically, and an electronic apparatus employing the same.

The present invention also provides a method for providing a GUI which prevents a pointer from moving to a GUI component which cannot be selected and informs a user of this sensuously, and an electronic apparatus employing the same.

The present invention also provides a method for providing a GUI which makes it difficult to move a pointer to a specific area and informs a user of this sensuously, and an electronic apparatus employing the same.

Consistent with an aspect of the present invention, a method for providing a GUI, comprises a displaying operation of displaying a GUI-component and a pointer used for indicating the GUI-component, a first moving operation of, if the pointer enters the GUI-component, moving the pointer toward a specific position of the GUI-component, and a first outputting operation of outputting at least one of an auditory effect and a tactile effect which are perceivable by a user while the pointer moves toward the specific position in the first moving operation.

The first outputting operation may gradually decrease the level of the at least one effect while the pointer moves toward the specific position in the first moving operation.

The first outputting operation may output the at least one effect at least one point of a time when the pointer enters the GUI-component and a time when the pointer reaches the specific position.

The first outputting operation may determine a direction in which the at least one effect is output according to a direction in which the pointer moves, and may output the at least one effect according to the determined direction.

The first moving operation may move the pointer toward the specific position of the GUI-component with a varying moving speed of the pointer, and the first outputting operation may adjust the level of the at least one effect according to the moving speed of the pointer.

The method may further comprise a determining operation of determining whether there is a user's manipulation to let the pointer escape from the specific position, if it is determined that there is the user's manipulation, a determining operation of determining the degree of the user's manipulation, a second moving operation of, if the degree of the user's manipulation is greater than a threshold, moving the pointer according to the user's manipulation and letting the pointer move to the outside of the GUI-component, and a second outputting operation of outputting at least one of an auditory effect and a tactile effect which are perceivable by the user while the pointer moves toward the specific position in the second moving operation.

A pattern for the at least one effect output in the first outputting operation may be different from a pattern for the at least one effect output in the second outputting operation.

The method may further comprise a third moving operation of, if the pointer escapes from the GUI-component, moving the pointer to a target GUI-component, and a third outputting operation of outputting at least one of an auditory effect and a tactile effect which are perceivable by the user while the pointer moves toward the target GUI-component in the third moving operation.

Consistent with an aspect of the present invention, a method for providing a GUI, comprises a displaying operation of displaying a GUI-component and a pointer used for indicating the GUI-component, a first moving operation of, if the pointer enters the GUI-component, moving the pointer to the outside of the GUI-component, and a first outputting operation of outputting at least one of an auditory effect and a tactile effect which are perceivable by a user while the pointer moves to the outside of the GUI-component in the first moving operation.

The first outputting operation may gradually increase the level of the at least one effect while the pointer moves to the outside of the GUI-component in the first moving operation.

The first outputting operation may output the at least one effect at least one point of a time when the pointer enters the GUI-component and a time when the pointer completely escapes from the GUI-component.

The first outputting operation may determine a direction in which at least one effect is output according to a direction in which the pointer moves, and may output the at least one effect according to the determined direction.

The first moving operation may move the pointer to the outside of the GUI-component with a varying moving speed of the pointer, and the first outputting operation may adjust the level of the at least one effect according to the moving speed of the pointer.

The method may further comprise a determining operation of determining whether there is user's manipulation to let the pointer pass through the GUI-component, a determining operation of, if it is determined that there is the user's manipulation, determining the degree of the user's manipulation, a second moving operation of, if the degree of the user's manipulation is greater than a threshold, moving the pointer to let the pointer pass through the GUI-component, and a second outputting operation of outputting at least one of an auditory effect and a tactile effect which are perceivable by the user while the pointer passes through the GUI-component in the second moving operation.

A pattern for the at least one effect which is output in the first outputting operation may be different from a pattern for the at least one which is output in the second outputting operation.

Consistent with an aspect of the present invention, a method for providing a GUI, comprises a determining operation of determining a position of a pointer, a first moving operation of, if the pointer is determined to be placed on a first area, moving the pointer according to user's manipulation, a second moving operation, if the pointer is determined to be placed on a second area, automatically moving the pointer to another position, and an outputting operation of outputting at least one of an auditory effect and a tactile effect which are perceivable by a user while the pointer moves to the another position in the second moving operation.

The second moving operation may move the pointer to another position with a visual effect that the pointer is moved by a specific force, and the specific force may include at least one of gravity, magnetic force, and electric force.

Consistent with an aspect of the present invention, a method for providing a GUI, comprises displaying a GUI-component and a pointer used for indicating the GUI-component, if the pointer enters an outer area of the GUI-component, moving the pointer toward a specific position, and outputting at least one of an auditory effect and a tactile effect which are perceivable by a user while the pointer moves toward the specific position in the moving operation.

Consistent with an aspect of the present invention, a method for providing a GUI, comprises displaying a GUI-component and a pointer used for indicating the GUI-component, if the pointer enters the GUI-component, moving the pointer regardless of user's intention, and outputting at least one of an auditory effect and a tactile effect which are perceivable by a user while the pointer moves in the moving operation.

Consistent with an aspect of the present invention, an electronic apparatus comprises a GUI generator which generates a GUI on which a GUI-component and a pointer used for indicating the GUI-component appear, and a controller which controls the GUI generator to move the pointer toward a specific position of the GUI-component if the pointer enters the GUI-component, and controls at least one of an auditory effect and a tactile effect which are perceivable by a user to be output while the pointer moves toward the specific position.

The at least one effect may be output from at least one of the electronic apparatus and a remote controller for the electronic apparatus.

Consistent with an aspect of the present invention, an electronic apparatus comprises a GUI generator which generates a GUI on which a GUI-component and a pointer used for indicating the GUI-component appear, and a controller which controls the GUI generator to move the pointer to the outside of the GUI-component if the pointer enters the GUI-component, and controls at least one of an auditory effect and a tactile effect which are perceivable by a user to be output while the pointer moves to the outside of the GUI-component.

The at least one effect may be output from at least one of the electronic apparatus and a remote controller for the electronic apparatus.

As described above, according to the exemplary embodiments of the present invention, the user can move the pointer to a desired GUI-component more easily and can enjoy entertainment by using a pointer with a sensuous effect that the pointer is moved on the display by gravity.

Also, the pointer is prevented from moving to a GUI-component which cannot be selected and the user is informed of this, so that the user feels it convenient to manipulate the pointer and enjoys entertainment with the sensuous effect.

Additional and/or other aspects and advantages of the invention will be set forth in part in the description which follows and, in part, will be obvious from the description, or may be learned by practice of the invention.

BRIEF DESCRIPTION OF DRAWINGS

The above and/or other aspects of the present invention will be more apparent by describing certain exemplary embodiments of the present invention with reference to the accompanying drawings, in which:

FIG. 31 is a flowchart illustrating a method for providing a GUI which uses a pointer having a visual effect showing that the pointer is moved by gravity consistent with an exemplary embodiment of the present invention, according to an exemplary embodiment.

DETAILED DESCRIPTION OF EXEMPLARY EMBODIMENTS

Figure 1:
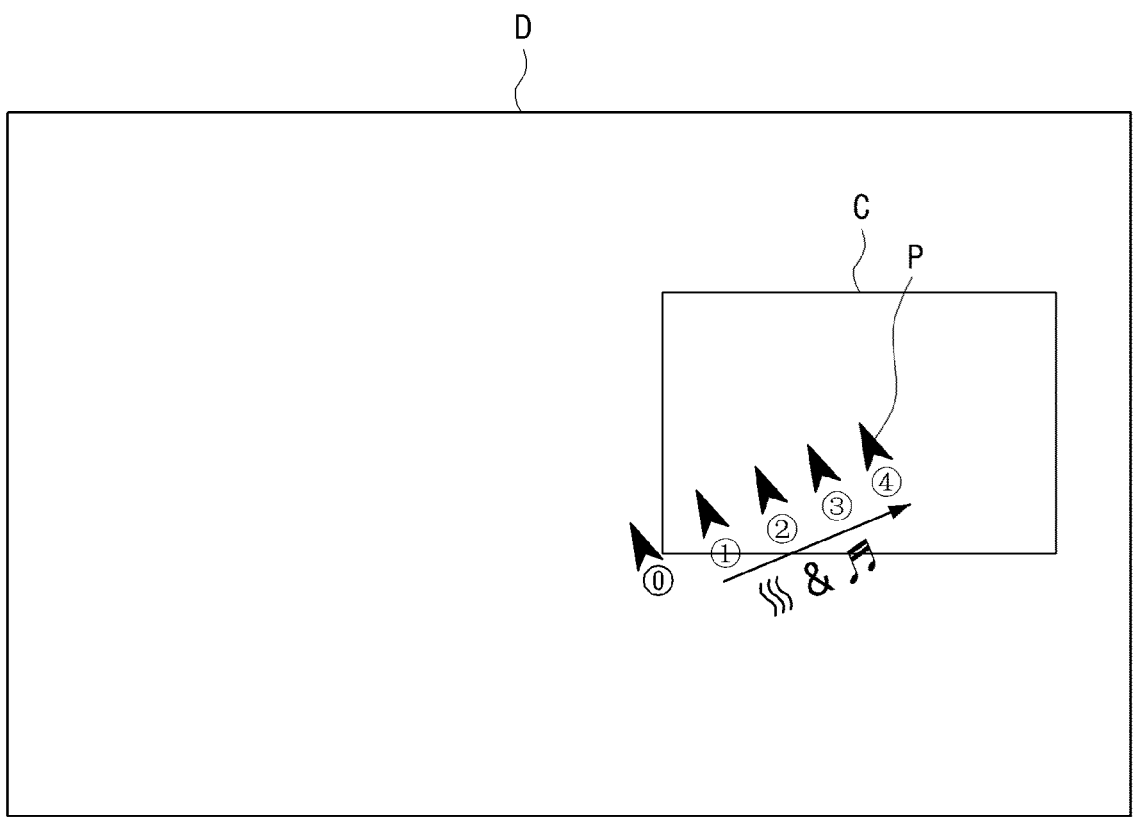
FIGS. 1 to 3 are views provided to explain a GUI to which the present invention can be applied, according to exemplary embodiments.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1 is a view provided to explain a graphical user interface (GUI) to which the present invention can be applied. In FIG. 1, a display D on which a GUI is displayed is illustrated.

As shown in FIG. 1, a pointer P and a GUI-component C appear on the GUI. Only one GUI-component C is illustrated in FIG. 1 but it is general that a plurality of GUI-components are displayed on the GUI. FIG. 1 illustrates only one GUI-component C for the convenience of explanation.

The GUI-component C is a target that a user desires to select to (1) input a desired command, (2) execute a desired function, or (3) receive desired information, and includes a menu, an icon, a folder, and contents. Also, any element that can help a user select one of the aforementioned operations can be incorporated into the GUI-component C.

The pointer P is used for indicating and selecting a GUI-component C desired by the user. Once the pointer P enters the GUI-component C, the pointer P can be moved regardless of the user's intention.

Although several pointers P are illustrated in FIG. 1, it should be noted that it does not mean that the several pointers P appear together on the GUI. The several pointers P are illustrated in FIG. 1 only for the purpose of expressing a moving track of the pointer P. The numerals marked under the pointers P represent a moving order of the pointer P and are applied to the other drawings in the same way.

FIG. 1 illustrates the movement of the pointer P when the pointer P enters the GUI-component C by user's manipulation. More specifically, if the pointer P is moved in the sequence of 0→1 by user's manipulation and enters the GUI-component C, the pointer P automatically moves in the sequence of 1→2→3→4.

In FIG. 1, an arrow is marked under 1, 2, 3 and 4. The region marked by the arrow means a region in which the pointer P automatically moves. The arrow shown in FIG. 1 means that the movement 1→2→3→4 of the pointer P is automatically achieved rather than by user's manipulation and is applied to other drawings in the same way.

As shown in FIG. 1, the pointer P is ultimately placed in the center of the GUI-component C. Also, the user only moves the pointer P in the sequence of 0→1. The movement 1→2→3→4 can be automatically achieved without user's manipulation. Therefore, once the pointer P enters the GUI-component C, the pointer P automatically moves toward the center of the GUI-component C.

While the pointer P moves in the sequence of 1→2→3→4, a sound is output. The sound can be output through a device equipped with a display D or a pointing device which is used for inputting user's manipulation to move the pointer P. Hereinbelow, the sound is output in the same way.

The sign "♪" marked under the arrow means that a sound is output while the pointer P moves in the sequence of 1→2→3→4 and is applied hereinbelow in the same way.

The level of sound may gradually decrease as the pointer moves in the sequence of 1→2→3→4. Alternatively, the sound may be output only at the time that the pointer P moves to 1 (that is, at the time that the pointer P enters the GUI-component C) and at the time that the pointer P moves to 4 (that is, at the time that the pointer P reaches the center of the GUI-component C).

Also, the pointing device vibrates while the pointer P moves in the sequence of 1→2→3→4. The sign "𝄞" marked under the arrow means that the pointing device vibrates while the pointer P moves in the sequence of 1→2→3→4 and is applied hereinbelow in the same way.

The degree of vibration may gradually decrease as the pointer P moves in the sequence of 1→2→3→4. Alternatively, the pointing device may vibrate only at the time that the pointer P moves to 1 (that is, at the time that the pointer P enters the GUI-component C) and at the time that the pointer P moves to 4 (that is, at the time that the pointer reaches the center of the GUI-component C).

Also, in order to make a user feel the effect that the pointer P moves rightward, the sound output from the right part of the pointing device may be louder than that output from the left part of the pointing device, and the vibration of the pointing device output from the right part of the pointing device may be greater than that output from the left part of the pointing device.

That is, it is possible to change the direction in which the sound and the vibration are output according to the moving direction of the pointer P.

If the sound is output and the pointing device vibrates while the pointer P moves toward the center of the GUI-component C as described above, the user feels as if the pointer P automatically moves toward the center of the GUI-component C by gravity.

Figure 2:
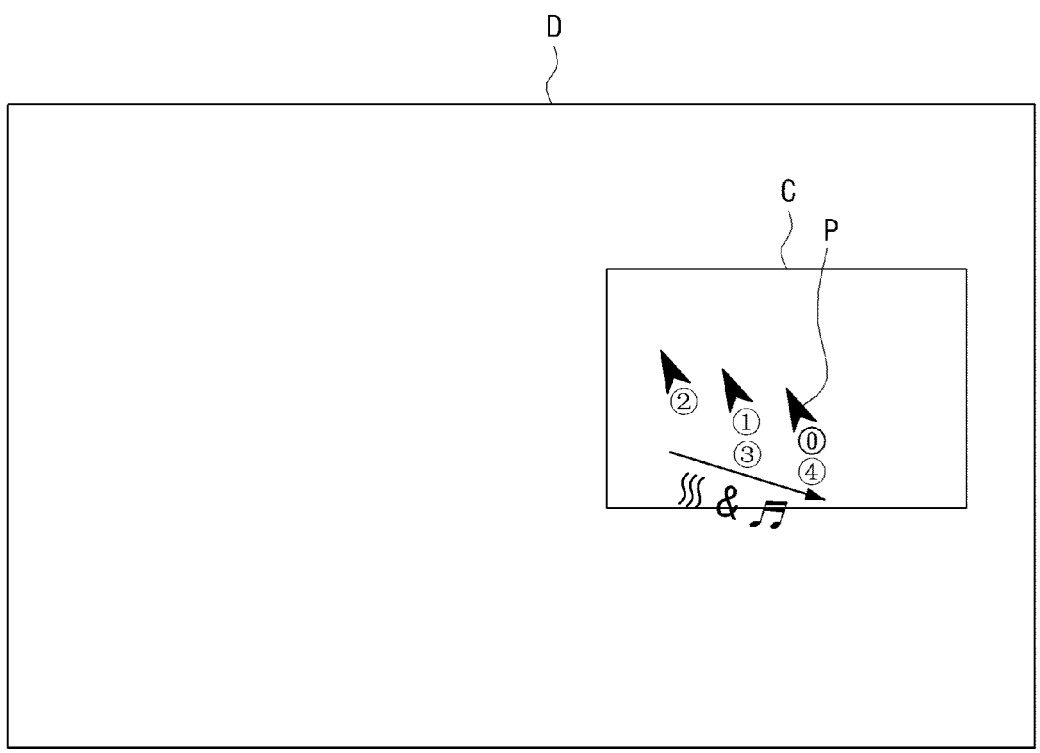
Figure 3:
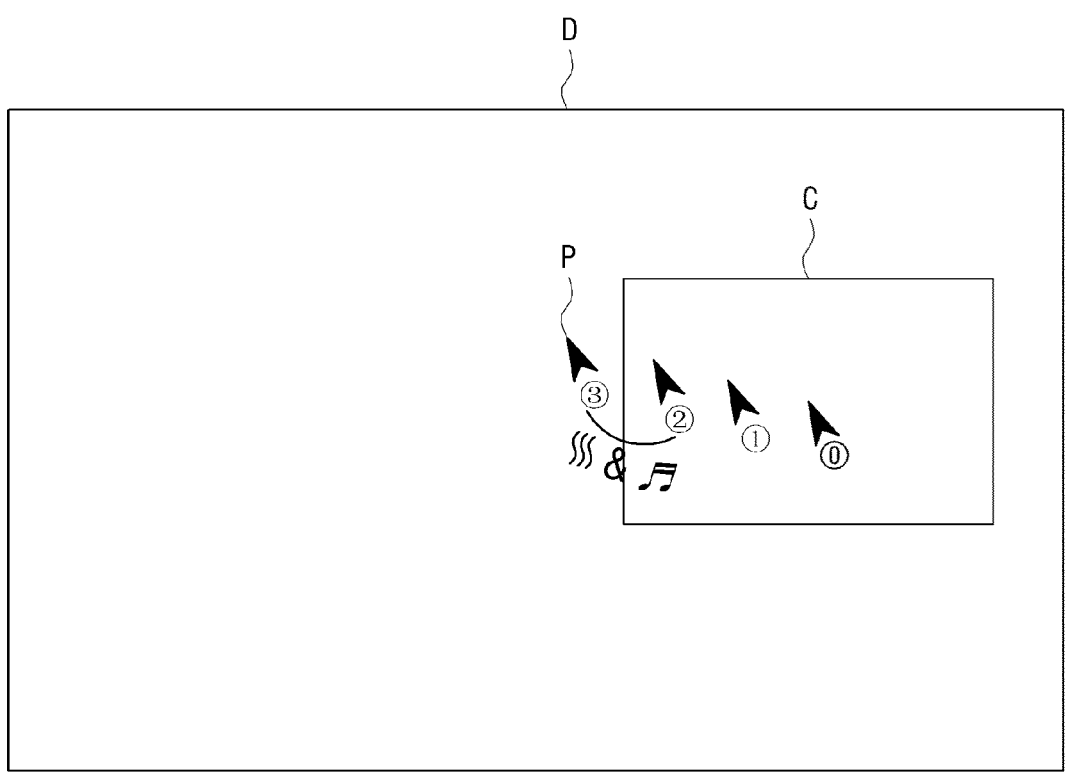

FIGS. 2 and 3 illustrate movement of a pointer P when there is user's manipulation to move the pointer P which is placed in the GUI-component C to the outside of the GUI-component C.

More specifically, in FIG. 2, the user moves the pointer P in the sequence of 0→1→2 but the pointer P automatically moves in the sequence of 2→3→4 such that the pointer P cannot escape from the GUI-component C and returns to the center of the GUI-component C.

A sound is output while the pointer P moves in the sequence of 2→3→4. The level of sound gradually decreases as the pointer P moves in the sequence of 2→3→4.

Also, the pointing device vibrates while the pointer P moves in the sequence of 2→3→4. The degree of vibration gradually decreases as the pointer P moves in the sequence of 2→3→4.

Also, in order to make the user feel the effect that the pointer P moves rightward, the sound output from the right part of the pointing device is louder than that output from the left part of the pointing device, and the vibration of the pointing device output from the right part of the pointing device is greater than that output from the left part of the pointing device.

FIG. 3 illustrates a pointer which is moved in the sequence of 0→1→2→3 by user's manipulation and ultimately escapes from the GUI-component C. Also, FIG. 3 illustrates the pointer P remaining outside the GUI-component C.

A sound is output while the pointer P moves in the sequence of 2→3. The sound has a pattern different from that of the sound which is output while the pointer P moves in the sequence of 2→3→4 in FIG. 2.

Also, the pointing device vibrates while the pointer P moves in the sequence of 2→3. The vibration has a pattern different from that of the vibration when the pointer P moves in the sequence of 2→3→4 in FIG. 2.

In order to make the user feel the effect that the pointer P moves leftward, the sound output from the left part of the device equipped with a display D or the pointing device is louder than that output from the right part of the device equipped with a display D or the pointing device, and the vibration of the pointing device output from the left part of the pointing device is greater than that output from the right part of the pointing device.

In FIG. 2, since the degree of user's manipulation to move the pointer P outside the GUI-component C, that is, to let the pointer P escape from the GUI-component C, is small (that is, since the degree of user's manipulation is less than a threshold), the pointer P cannot move outside the GUI-component C, that is, the pointer P cannot escape from the GUI-component C.

In FIG. 3, since the degree of user's manipulation to move the pointer P outside the GUI-component C, that is, to let the pointer P escape from the GUI-component C is great (that is, since the degree of user's manipulation is greater than a threshold), the pointer moves outside the GUI-component C, that is, escapes from the GUI-component C.

In the case of FIGS. 2 and 3, the user feels as if the gravity is exerted toward the center of the GUI-component C.

Figure 4:
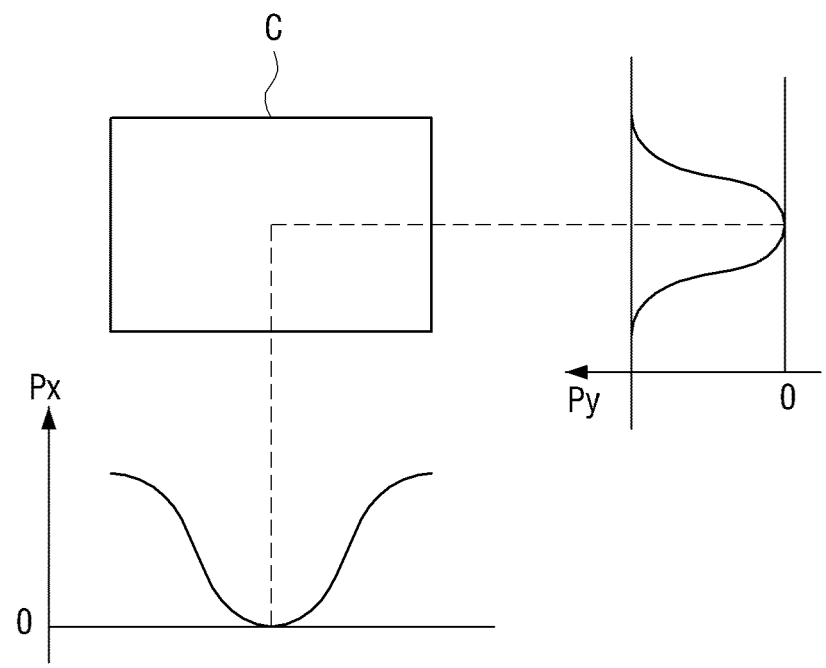
FIG. 4 is a view illustrating potential energy distribution in the GUI-component shown in FIG. 1, according to an exemplary embodiment.

On the assumption that the gravity is exerted toward the center of the GUI-component C, the potential energy in the GUI-component C due to the gravity is distributed as shown in FIG. 4 and the pointer P moves from a point at which the potential energy is high and to a point at which the potential energy is low.

Referring to FIG. 4, the potential energy in the GUI-component C is lowest at the center of the GUI-component C, and the potential energy for both the x-axis and the y-axis is "0". Accordingly, the pointer P ultimately moves toward the center of the GUI-component where the potential energy is lowest.

The speed of the pointer P which moves toward the center of the GUI-component C is determined according to the potential energy distribution in the GUI-component C. However, the moving speed of the pointer P does not necessarily correspond to the potential energy distribution in the GUI-component C. The speed of the pointer P which moves toward the center of the GUI-component C may be realized in a linear or non-linear manner.

It is possible to realize the level of sound and the degree of vibration to be in proportional to the moving speed of the pointer P.

Figure 5:
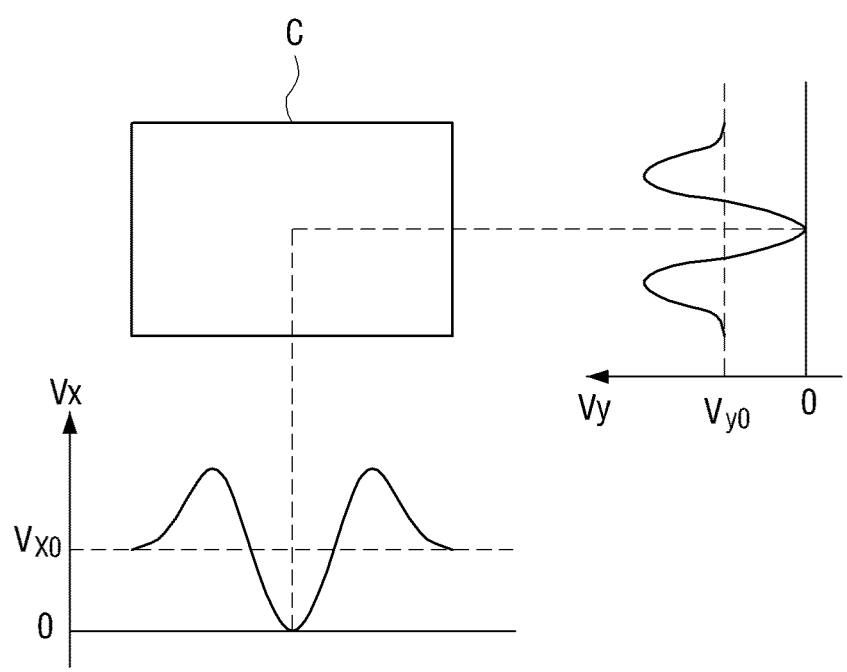
FIGS. 5 to 7 are views illustrating examples of realizing a moving speed of a pointer P which moves toward the center of a GUI-component in a non-linear manner, according to exemplary embodiments.
Figure 6:
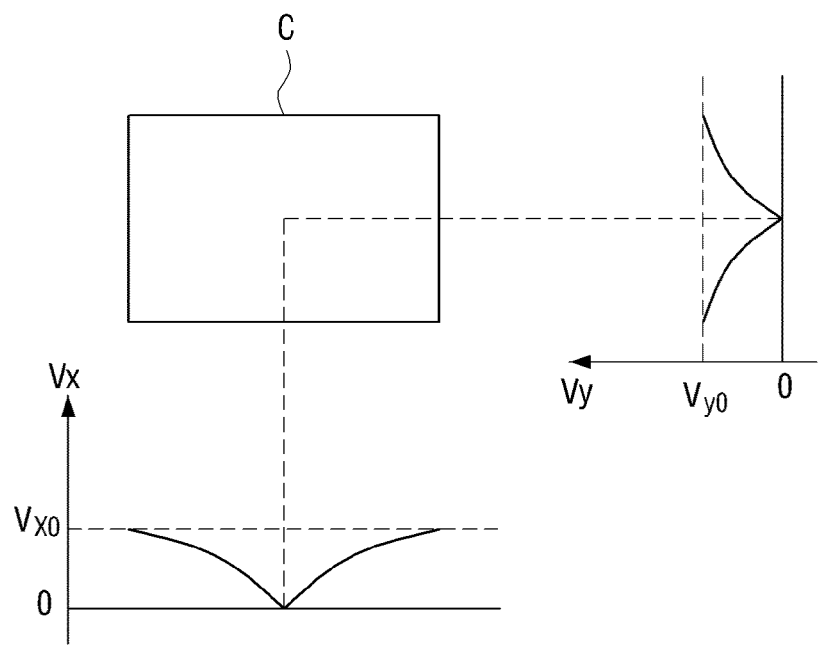
Figure 7:
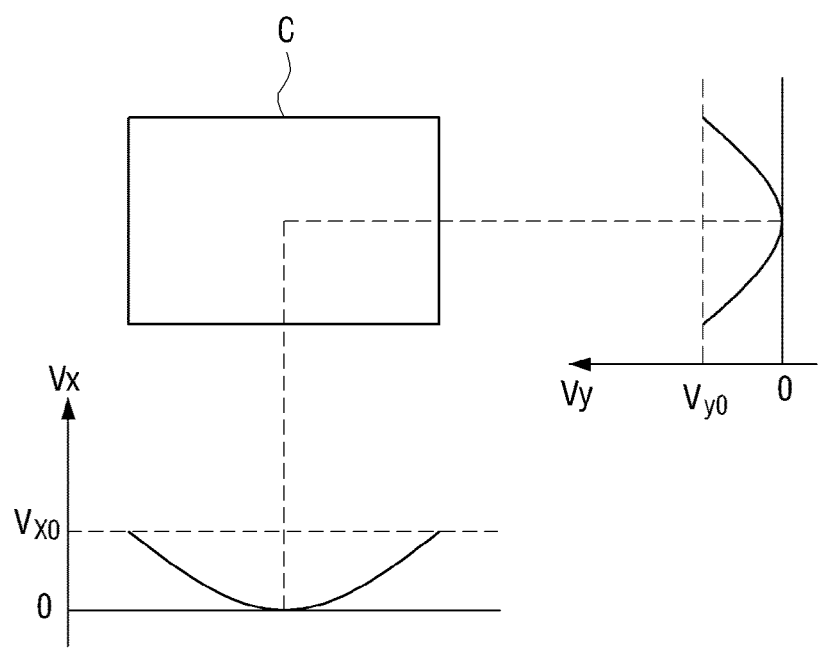

FIGS. 5 to 7 illustrate examples in which the speed of the pointer P which moves toward the center of the GUI-component C is realized in a non-linear manner.

FIG. 5 illustrates the distribution of the moving speed of the pointer P in the GUI-component if the moving speed of the pointer P progressively increases when the pointer P enters the GUI-component C, reduces at any instant, and then reaches 0 at the center of the GUI-component C.

The moving speed $(V_{x0}, V_{y0})$ of the pointer P at the time that the pointer enters the GUI-component C corresponds to the moving speed of the pointer P right before the pointer P enters the GUI-component C. This is to make the moving speed of the pointer P continuous at the boundary of the GUI-component C. Of course, it is possible to make the moving speed of the pointer P discontinuous in the GUI-component.

FIGS. 6 and 7 illustrate the distribution of the moving speed of the pointer P in the GUI-component C if the moving speed progressively decreases when the pointer P enters the GUI-component C and then reaches "0" at the center of the GUI-component C.

In this case, the moving speed $(V_{x0}, V_{y0})$ of the pointer P at the time that the pointer P enters the GUI-component C corresponds to the moving speed of the pointer P right before the pointer P enters the GUI-component C.

The GUI-component C appearing on the GUI described above has a rectangular shape which is a closed shape and the pointer P automatically moves toward the center of the GUI-component C. Such a GUI-component C can be applied to an activated GUI-component, that is, a GUI component which can be selected by the user with the pointer P.

Also, the GUI-component C may be applied to an advertisement item, a banner advertisement, a menu item preferred by the user.

Figure 8:
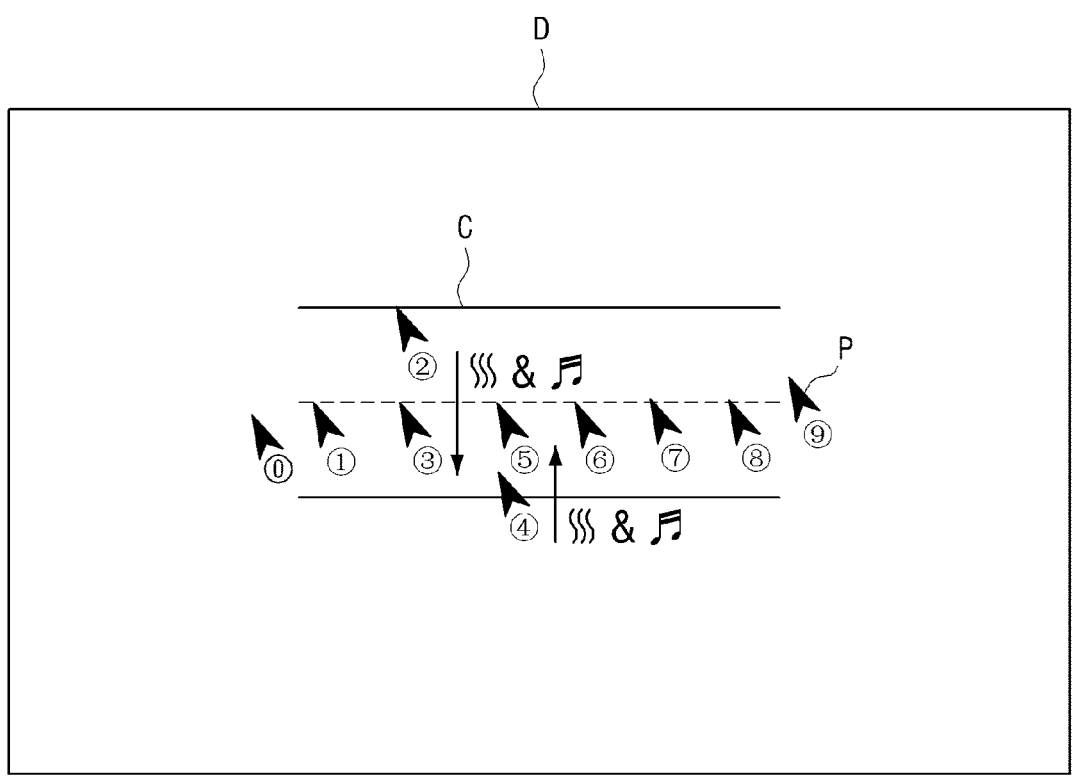
FIG. 8 is a view provided to explain a GUI on which a GUI-component of a straight band type appears, according to an exemplary embodiment.

FIG. 8 illustrates a display D on which a GUI including a GUI-component C of another type which is different from that of FIG. 1 is displayed.

FIG. 8 illustrates the movement of a pointer P when the pointer P enters the GUI-component C by user's manipulation. More specifically, FIG. 8 illustrates a GUI on which the pointer P stays in the center line of the GUI-component C.

As shown in FIG. 8, if the user moves the pointer P along the center line of the GUI-component C, the pointer P is moved according to user's manipulation. For example, the pointer P is moved in the sequence of 5→6→7→8 by user's manipulation.

However, if the pointer P escapes from the center line of the GUI-component C by user's manipulation, the pointer P automatically returns to the center line of the GUI-component C. For example, if the pointer P is moved in the sequence of 1→2 by user's manipulation, the pointer P automatically moves in the sequence of 2→3, returning to the center line. Also, if the pointer P is moved in the sequence of 3→4 by user's manipulation, the pointer P automatically moves in the sequence of 4→5, returning to the center line.

A sound is output and the pointing device vibrates while the pointer P moves in the sequence of 2→3 or 4→5.

In order to make the user feel the effect that the pointer P moves downwardly when the pointer P moves in the sequence of 2→3, the sound output from the lower part of the device equipped with a display D or the pointing device may be louder than that output from the upper part of the device equipped with a display D or the pointing device, and the vibration of the pointing device output from the lower part of the pointing device may be greater than that output from the upper part of the pointing device.

Likewise, in order to make the user feel the effect that the pointer P moves upwardly when the pointer moves in the sequence of 4→5, the sound output from the upper part of the device equipped with a display D or the pointing device may be louder than that output from the lower part of the device equipped with a display D or the pointing device, and the vibration of the pointing device output from the upper part of the pointing device is greater than that output from the lower part of the pointing device.

Since the sound is output and the pointing device vibrates while the pointer P escaping from the center line of the GUI-component C automatically returns to the center line of the GUI-component C, the user feels as if the pointer P automatically moves toward the center line of the GUI-component C by gravity.

Of course, in FIG. 8, since the degree of user's manipulation to move the pointer P outside the GUI-component C, that is, to let the pointer P escape from the GUI-component C, is small (that is, since the degree of user's manipulation is less than a threshold), the pointer P cannot be moved to the outside of the GUI-component C, that is, cannot escape from the GUI-component C.

If the degree of user's manipulation to move the pointer P to the outside of the GUI-component C, that is, to let the pointer P escape from the GUI-component C, is great (if the degree of user's manipulation is greater than a threshold), the pointer P can be moved to the outside of the GUI-component C, that is, can escape from the GUI-component C.

A sound may be output and the pointing device may vibrate at the time that the pointer P escapes from the GUI-component C. The pattern of the sound may be different from that of the sound which is output when the pointer P of FIG. 8 moves in the sequence of 2→3 or 4→5. Also, the pattern of the vibration may be different from that of the vibration which is output when the pointer P of FIG. 8 moves in the sequence of 2→3 or 4→5.

In the case of FIG. 8, the user feels as if the gravity is exerted toward the center line of the GUI-component C and the pointer P moves toward the center line of the GUI-component C by gravity.

Figure 9:
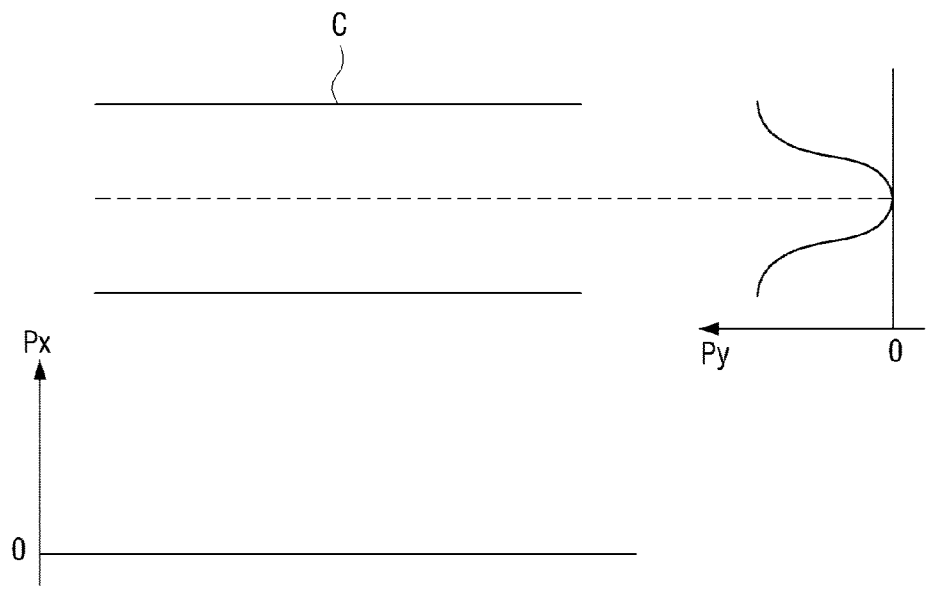
FIG. 9 is a view illustrating potential energy distribution in the GUI-component shown in FIG. 8, according to an exemplary embodiment.

On the assumption that the gravity is exerted toward the center line of the GUI-component C as described above, the potential energy in the GUI-component C due to the gravity is distributed as shown in FIG. 9 and the pointer P is moved from a point where the potential energy is high to a point where the potential energy is low.

Referring to FIG. 9, the potential energy with respect to the x-axis in the GUI-component C is "0" over all the points. Also, the potential energy with respect to the y-axis in the GUI-component C is lowest at the center line of the GUI-component C, that is, is "0" at the center line. Therefore, the pointer P ultimately moves toward the center line where the potential energy is lowest.

The moving speed of the pointer P which returns to the center line after escaping from the GUI-component C is determined according to the distribution of the potential energy in the GUI-component C. However, the moving speed of the pointer P does not necessarily correspond to the distribution of the potential energy in the GUI-component C. That is, the moving speed of the pointer P which returns to the center line after escaping from the center line of the GUI-component C may be realized in a linear or a non-linear manner.

It is possible to realize the level of sound and the degree of vibration to be in proportional to the moving speed of the pointer P.

Figure 10:
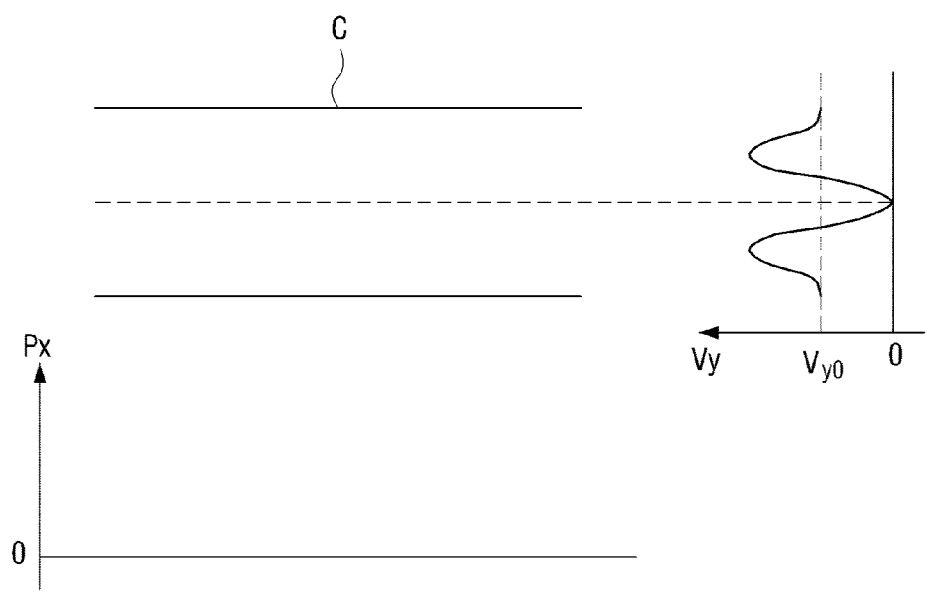
FIG. 10 is a view illustrating an example of realizing a moving speed of a pointer P which moves toward the center of a GUI-component in a non-linear manner, according to an exemplary embodiment.

FIG. 10 illustrates an example in which the moving speed of the pointer P which returns to the center line after escaping from the center line of the GUI-component C is realized in a non-linear manner.

FIG. 10 illustrates the distribution of the moving speed of the pointer P which moves toward the center line when the pointer P escapes from the center line of the GUI-component C, wherein the speed progressively increases, decreases at any instant, and then reaches "0" at the center line of the GUI-component C.

The GUI-component C appearing on the GUI described above is a straight band shape and is a GUI-component that induces the pointer P to move along the center line of the GUI-component C.

Figure 11:
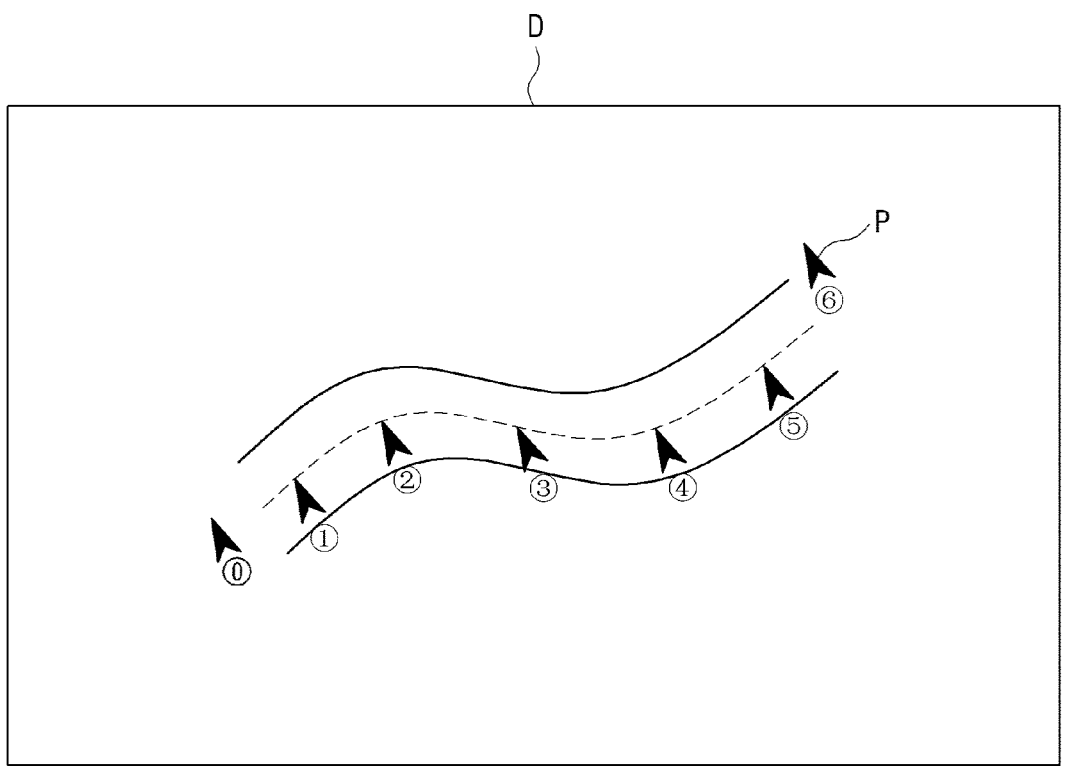
FIG. 11 is a view provided to explain a GUI on which a GUI-component of a curved band type appears, according to an exemplary embodiment.

FIG. 11 illustrates a GUI-component C of a curved band shape. The GUI-component C shown in FIG. 11 induces the pointer P to move in the sequence of 1→2→3→4→5 along the center line of the curved band.

Figure 12:
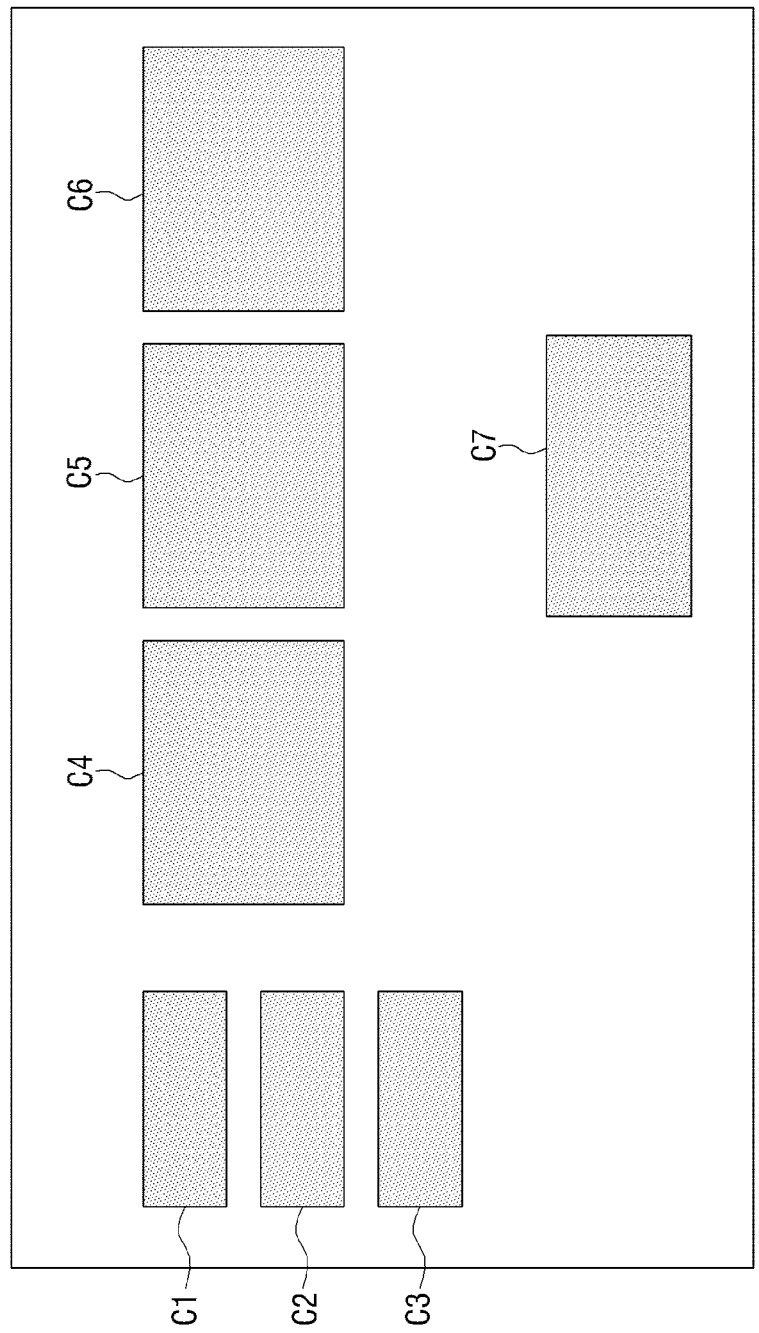
FIGS. 12 to 15 are views provided to explain a process of designing a GUI on which a plurality of GUI-components are arranged, according to exemplary embodiments.

FIG. 12 illustrates a display D on which a GUI having a plurality of GUI-components C1 to C7 is displayed. The GUI-components C1 to C7 arranged on the GUI shown in FIG. 12 are displayed on the display D so that they can be viewed by the user with his/her eyes. Also, the user selects one of the GUI-components C1 to C7 by placing the pointer P on it.

Figure 13:
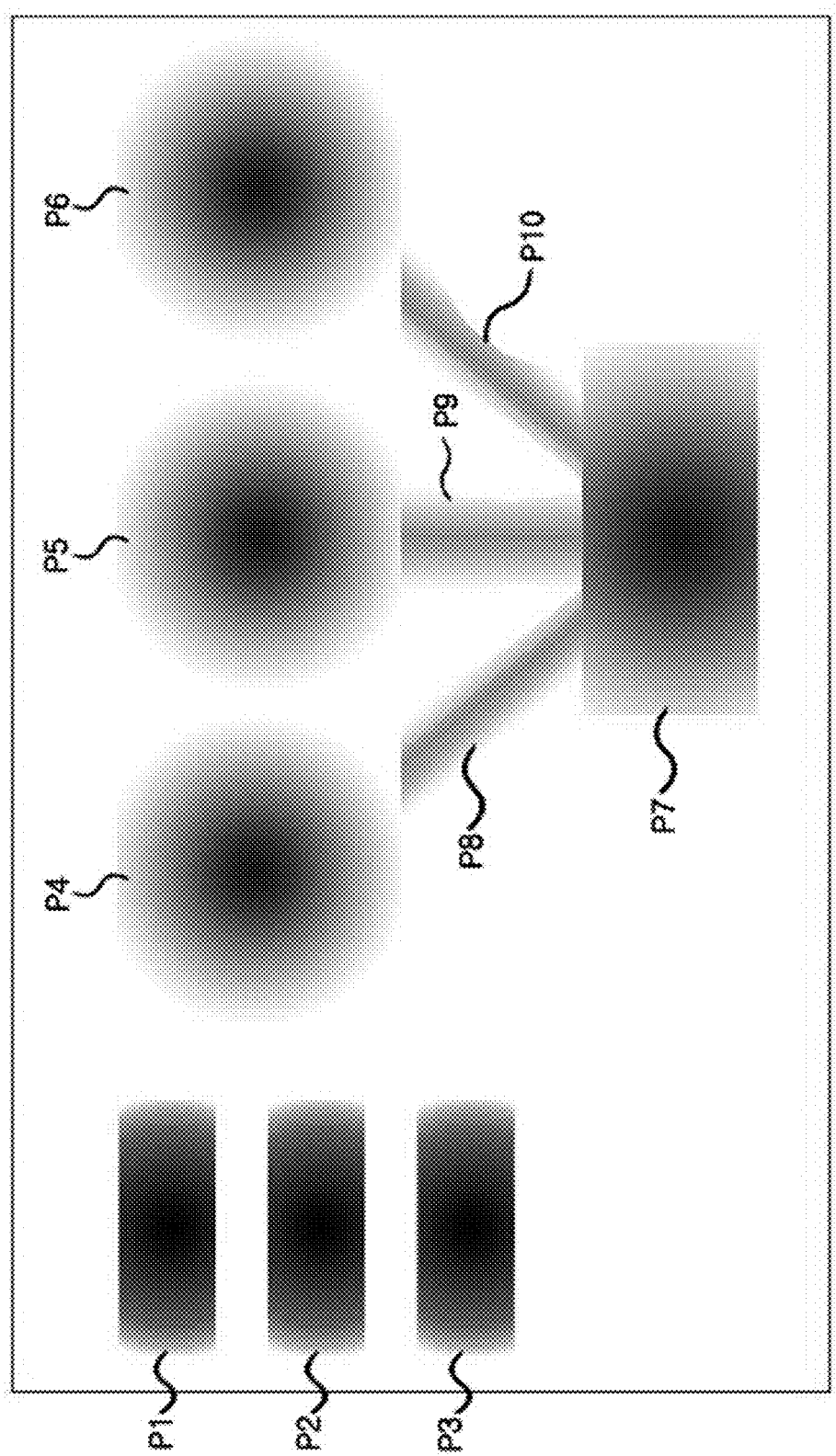

FIG. 13 illustrates distributions of the potential energy P1 to P7 with respect to the plurality of GUI-components C1 to C7 shown in FIG. 12. In FIG. 13, the potential energy is low where brightness is low (black color) and is high where the brightness is high (white color).

Accordingly, it can be seen that the pointer P which enters the GUI-components C1 to C7 automatically moves toward the center of the GUI-components C1 to C7. That is, the GUI-components C1 to C7 are of the same type as that of FIG. 1.

FIG. 13 also illustrates distributions of the potential energy with respect to connecting passages P8 to P10 which are not shown in FIG. 12. The connecting passages are not visible to the user as shown in FIG. 12 but can be dealt as a GUI-component because they constitute the GUI.

Referring to the distributions P8 to P10 of the potential energy in the connecting passages, it can be seen that the pointer P which escapes from the center line of the connecting passage automatically returns to the center line of the connecting passage. That is, the connecting passages are GUI-components of the same type as that of FIG. 8.

More specifically, the connecting passages facilitate the user's manipulation to 1) move the pointer P from the GUI-component C7 to the GUI-component C4 or in a reverse direction, 2) move the pointer P from the GUI-component C7 to the GUI-component C5 or in a reverse direction, and 3) move the pointer P from the GUI-component C7 to the GUI-component C6 or in a reverse direction. Since the potential energy along the center line of the connecting passage is lower than that at the other points, the pointer P is induced to move along the center line of the connecting passage.

Figure 14:
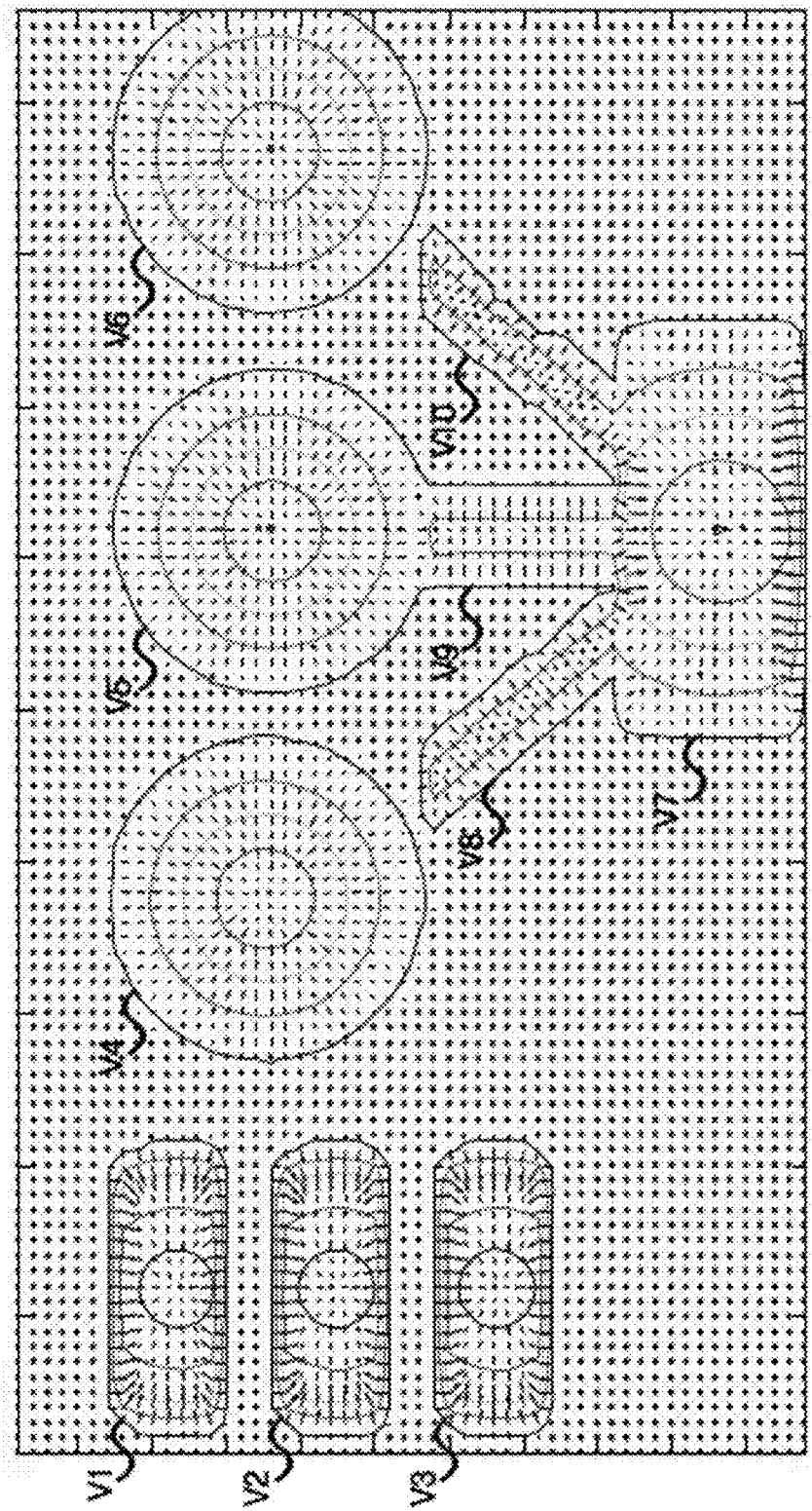
Figure 15:
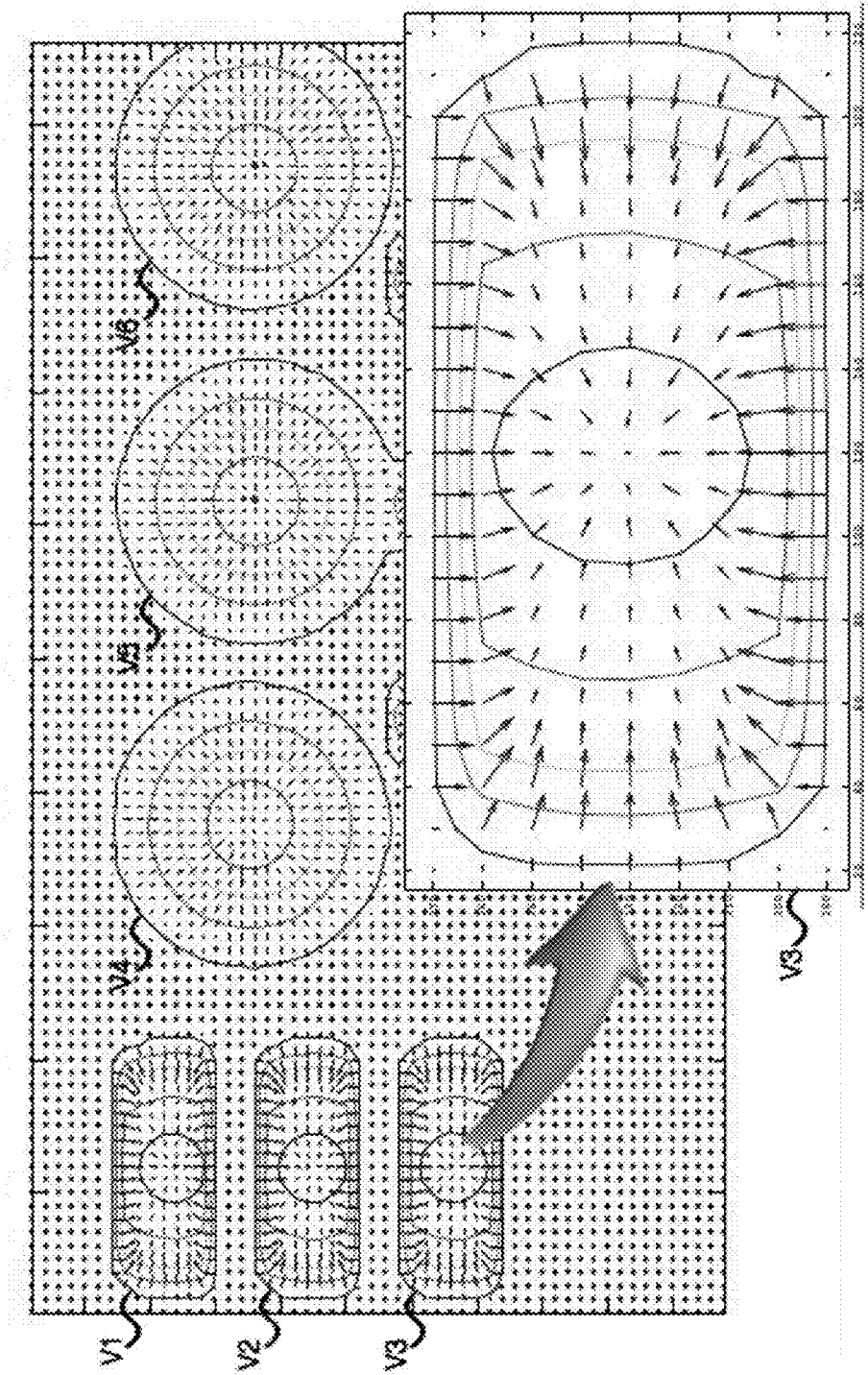

FIG. 14 illustrates distribution of a vector of moving speed of the pointer P which is prepared based on the distribution of the potential energy with respect to the GUI shown in FIG. 13. FIG. 15 shows an enlarged view of the distribution of the vector of the moving speed of the pointer P in the GUI-component C3 of FIG. 14.

The distribution of the vector of the moving speed of the pointer P shown in FIGS. 14 and 15 serves as a guideline on how to process the pointer P based on the position of the pointer P if the GUI is designed as shown in FIG. 12. That is, the distribution of the vector of the moving speed of the pointer P shown in FIGS. 14 and 15 is a guideline on whether or not the pointer P is automatically moved to another position based on the position of the pointer P and on how fast the pointer P is moved.

In other words, the distribution of the vector of the moving speed of the pointer P shown in FIGS. 14 and 15 may be a map in which information regarding a position where the pointer P will automatically move is defined for each current position of the pointer P.

The GUI described above is prepared in order shown in FIGS. 12 to 14. Also, the position of the pointer P is controlled with reference to the distribution of the vector of the moving speed of the pointer P shown in FIGS. 14 and 15.

Meanwhile, if the pointer P escapes from the GUI-component C as in the case of FIG. 3, the pointer P can move and enter another GUI-component regardless of user's intension.

Figure 16:
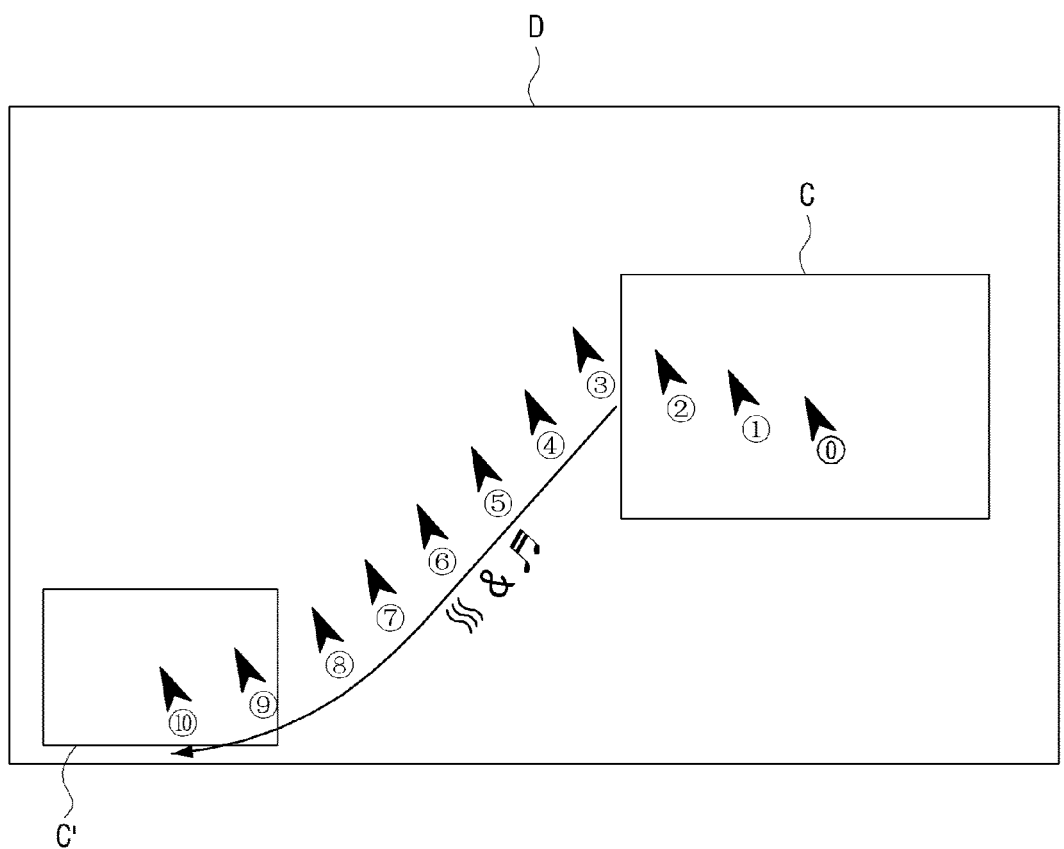
FIGS. 16 and 17 are views illustrating a pointer which escapes from a GUI-component and automatically enters another GUI-component, according to exemplary embodiments.

FIG. 16 illustrates a pointer P which escapes from the GUI-component C and automatically moves toward another GUI-component C'.

More specifically, if the pointer P is moved in the sequence of 0→1→2→3 by user's manipulation and escapes from the GUI-component C, the pointer P automatically moves in the sequence of 3→4→5→6→7→8→9→10.

As shown in FIG. 16, a sound is output while the pointer P moves in the sequence of 3→4→5→6→7→8→9→10. The level of sound may gradually decrease as the pointer moves in the sequence of 3→4→5→6→7→8→9→10.

Alternatively, the pattern of the sound which is output in the section of 3→4→5→6→7→8, that is before the pointer P enters another GUI-component C' may be different from that of the sound which is output in the section of 8→9→10, that is at the time when the pointer P enters another GUI-component C' and after the entrance.

Also, the pointing device vibrates while the pointer P moves in the sequence of 3→4→5→6→7→8→9→10. The degree of vibration may gradually decrease as the pointer P moves in the sequence of 3→4→5→6→7→8→9→10.

Alternatively, the pattern of the vibration which is output in the section of 3→4→5→6→7→8, that is before the pointer P enters another GUI-component C' may be different from that of the vibration which is output in the section of 8→9→10, that is at the time when the pointer P enters another GUI-component C' and after the entrance.

As shown in FIG. 16, the pointer P which escapes from the GUI-component C enters another GUI-component C' and is ultimately placed in the center of another GUI-component C'.

In this case, the user only moves the pointer P in the sequence of 0→1→2→3. The movement 3→4→5→6→7→8→9→10 is automatically achieved without user's manipulation.

Accordingly, once the pointer P escapes from the GUI-component C, the pointer P enters another GUI-component C' and automatically moves toward the center of the GUI-component C'.

If a sound is output and the pointing device vibrates while the pointer P moves toward the center of another GUI-component C' as described above, the user feels as if the pointer P automatically moves toward the center of another GUI-component C' by gravity.

Figure 17:
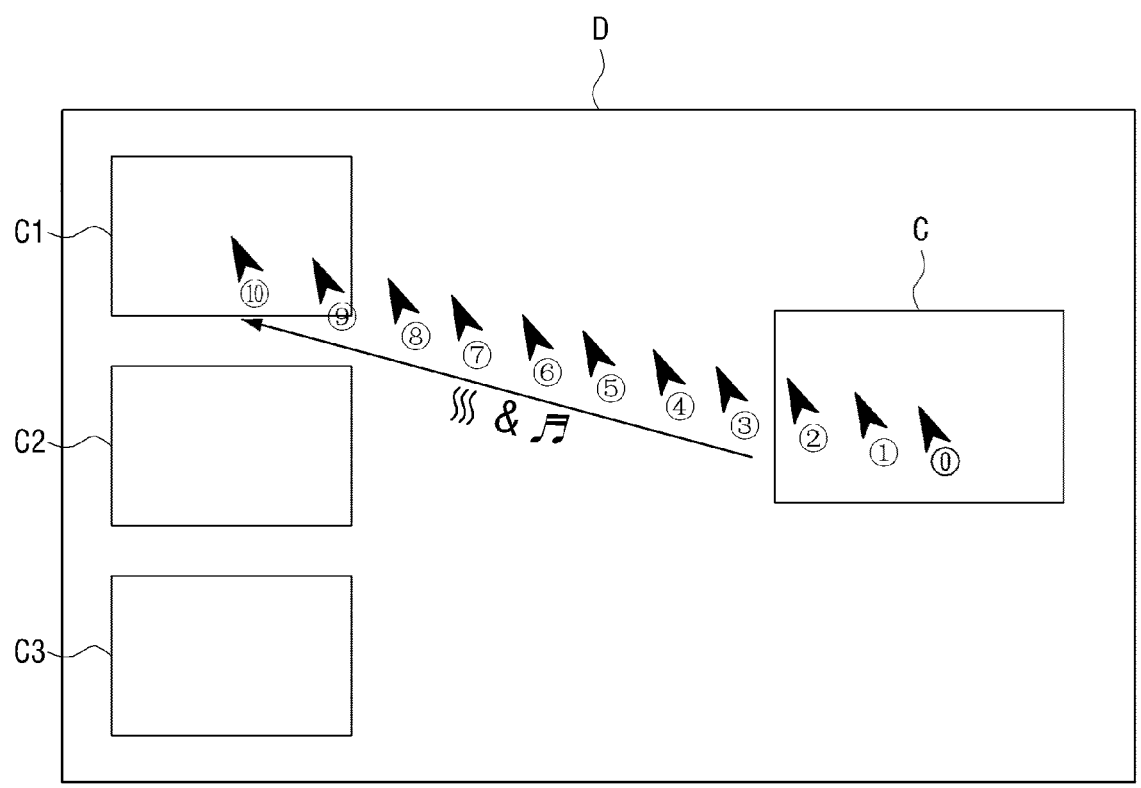

FIG. 17 illustrates a pointer P which escapes from a GUI-component C and moves toward one of the other GUI-components C1, C2, C3. More specifically, FIG. 17 illustrates the pointer P which automatically moves and enters the GUI-component C1 which exists in the line extending in the moving direction of the pointer P.

That is, if the pointer P is moved in the sequence of 0→1→2→3 by user's manipulation and escapes from the GUI-component C, the pointer P automatically moves in the sequence of 3→4→5→6→7→8→9→10 and simultaneously a sound and vibration are output.

The GUI-component which the pointer P escaping from the GUI-component C enters is determined based on the direction of the pointer P which is moved by user's manipulation. It is also possible to set the pointer P to move and enter another GUI-component matching with the GUI-component C from which the pointer P escapes.

Figure 18:
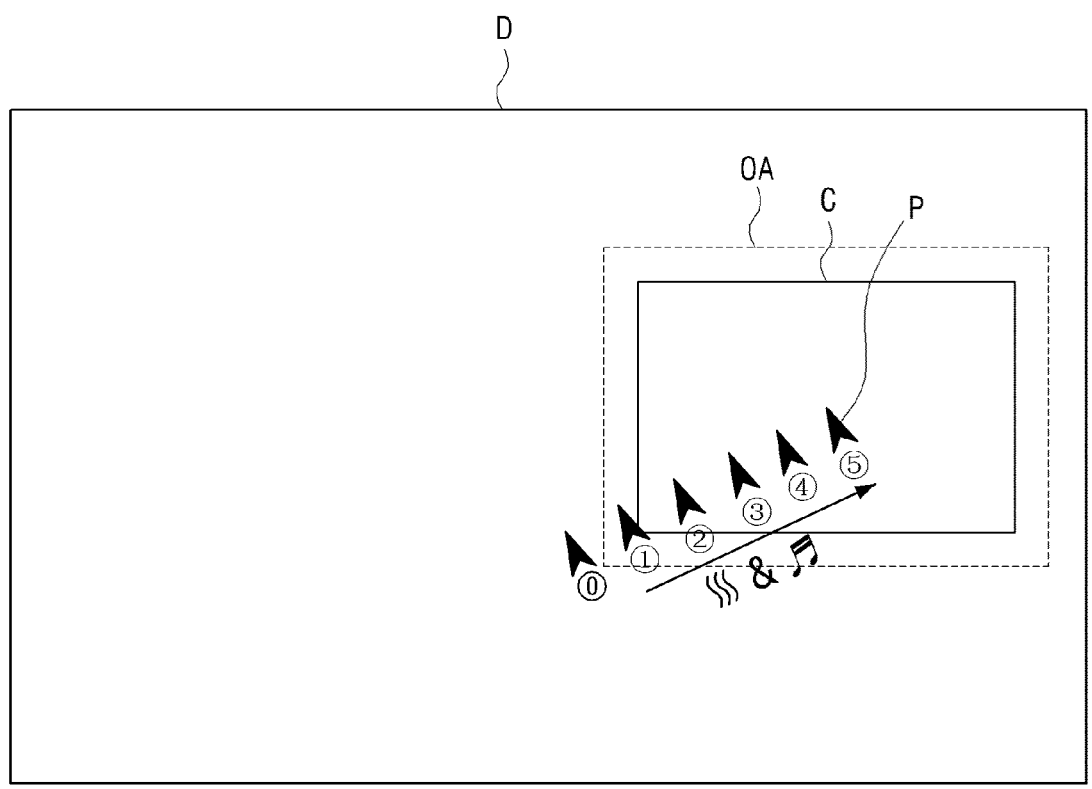
FIG. 18 is a view illustrating a pointer which moves under a different condition from that of FIG. 1, according to an exemplary embodiment.

FIG. 18 illustrates a pointer P which is moved under a different condition from that of FIG. 1. More specifically, if the pointer P is moved in the sequence of 0→1 by user's manipulation and enters an outer area OA of the GUI-component C, the pointer P automatically moves in the sequence of 1→2→3→4→5 and simultaneously a sound and vibration are output.

As in the case of FIG. 1, the pointer P is ultimately placed in the center of the GUI-component C. In this case, the user only moves the pointer P in the sequence of 0→1. The movement 1→2→3→4→5 is automatically achieved without user's manipulation.

However, in FIG. 18, if the pointer P enters the outer area OA of the GUI-component C, the pointer P automatically moves toward the center of the GUI-component C.

Hereinafter, the case where the pointer P moves toward the center of the GUI-component C but is ultimately placed around the center of the GUI-component C rather than in the center of the GUI-component C will be described.

Figure 19:
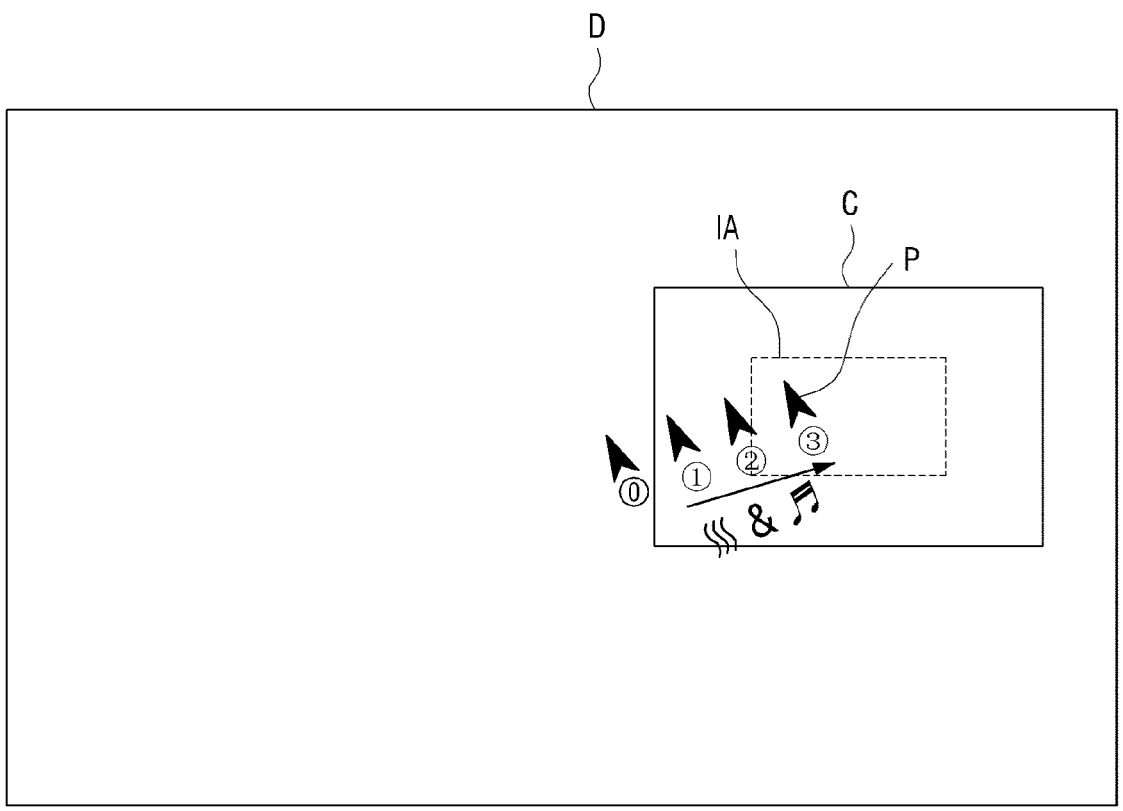
FIGS. 19 and 20 are views illustrating a pointer which is ultimately placed in the inner area of a GUI-component, according to exemplary embodiments.

In FIG. 19, if the pointer P is moved in the sequence of 0→1 by user's manipulation and enters the GUI-component C, the pointer P automatically moves in the sequence of 1→2→3 and simultaneously a sound and vibration are output.

Unlike the case of FIG. 1 or 18, the pointer P is ultimately placed in the inner area IA of the GUI-component C in FIG. 19. That is, the pointer P is ultimately placed around the center of the GUI-component C rather than in the center of the GUI-component C.

In other words, the pointer P moves toward the center of the GUI-component C and stops when the pointer P enters the inner area IA.

It is also possible to set the pointer P to stop at the edge of the inner area IA of the GUI-component C.

Figure 20:
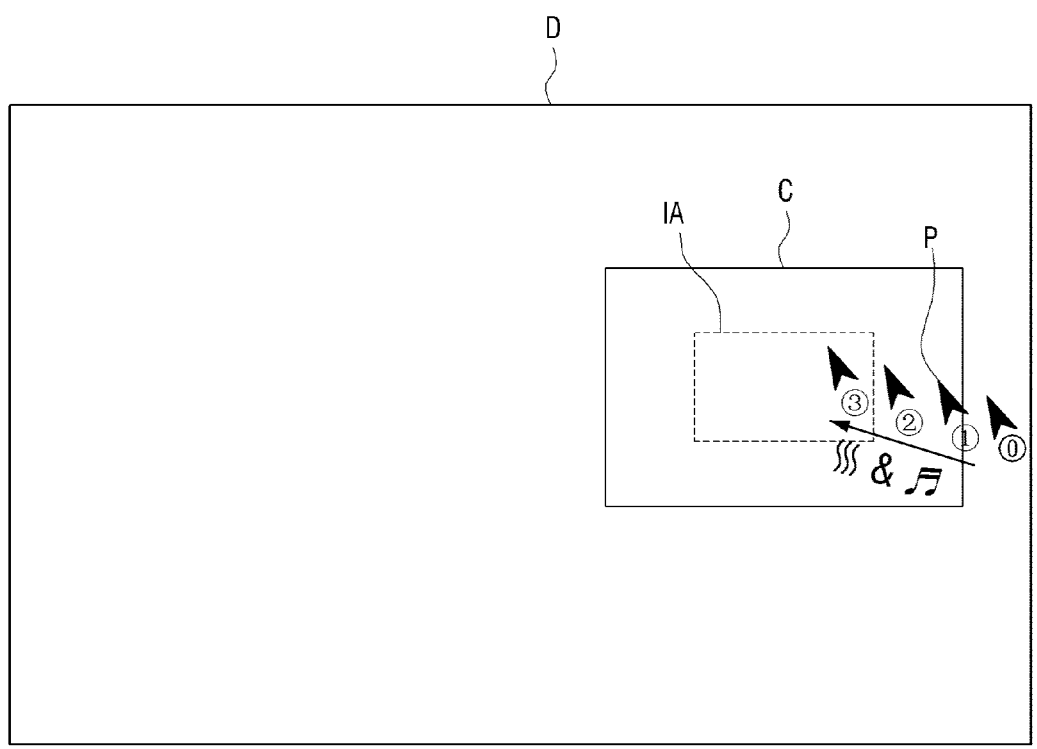

In FIG. 20, if the pointer P is moved in the sequence of 0→1 by user's manipulation and enters the GUI-component C, the pointer P automatically moves in the sequence of 1→2→3 and simultaneously a sound and vibration are output.

The case of FIG. 20 differs from the case of FIG. 19 in the position where the pointer P is ultimately placed. This difference is caused by a difference in the portion of the GUI-component C which the pointer P enters.

That is, if the pointer P enters the left side of the GUI-component C as shown in FIG. 19, the pointer P is ultimately placed on the left from the center of the GUI-component C, whereas if the pointer P enters the right side of the GUI-component C as shown in FIG. 20, the pointer P is ultimately placed on the right from the center of the GUI-component C.

That is, the ultimate position of the pointer P is determined according to the moving direction of the pointer P at the time that the pointer P enters the GUI-component C.

In the case of FIGS. 19 and 20, the user only moves the pointer P in the sequence of 0→1. The movement 1→2→3 is automatically achieved without user's manipulation.

Figure 21:
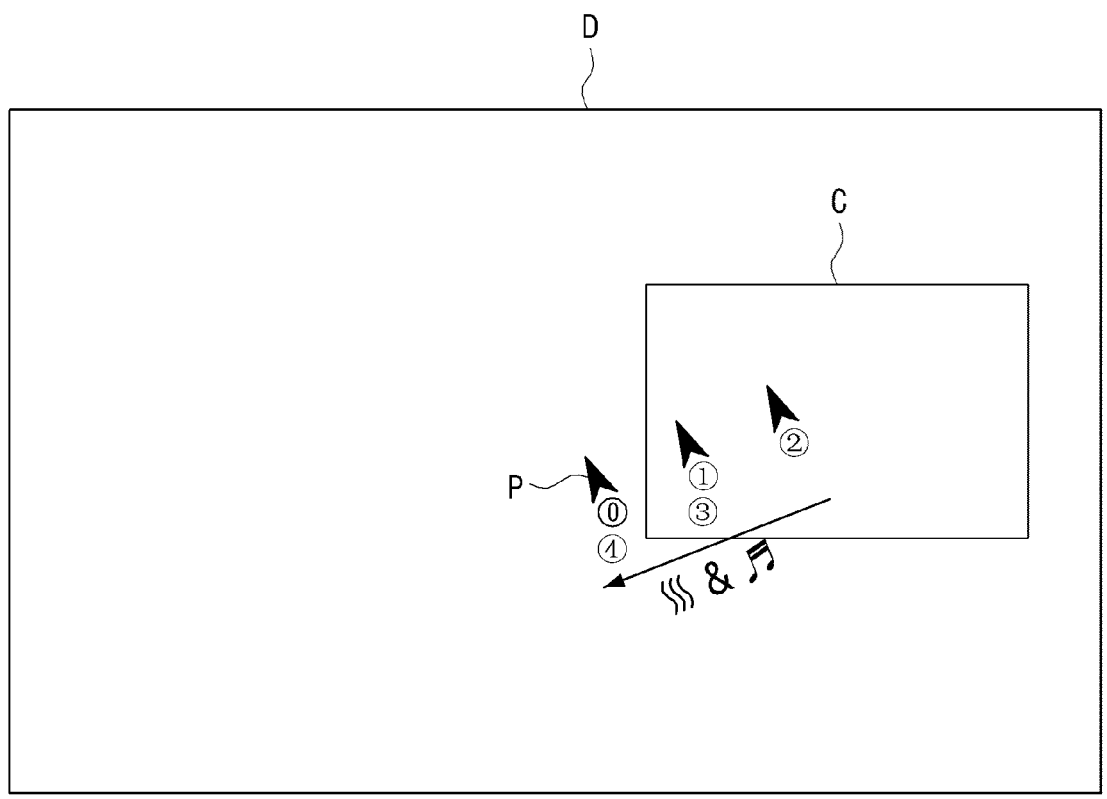
FIGS. 21 and 22 are views provided to explain another GUI to which the present invention can be applied, according to exemplary embodiments.

FIG. 21 is a view provided to explain another GUI to which the present invention can be applied. In FIG. 21, if the pointer P is moved in the sequence of 0→1→2 by user's manipulation and enters the GUI-component C, the pointer P automatically moves in the sequence of 2→3→4.

Ultimately, the pointer P is placed outside the GUI-component C. In this case, the user only moves the pointer P in the sequence of 0→1→2. The movement 2→3→4 is automatically achieved without user's manipulation.

That is, once the pointer P enters the GUI-component C, the pointer P automatically moves to the outside of the GUI-component C.

A sound is output while the pointer P moves in the sequence of 2→3→4. The level of sound may gradually increase as the pointer P moves in the sequence of 1→2→3→4. Alternatively, the sound may be output only when the pointer is moved to 0 (that is, when the pointer escapes from the GUI-component C).

Also, the pointing device vibrates while the pointer P moves in the sequence of 2→3→4. The degree of vibration may gradually increase as the pointer moves in the sequence of 2→3→4. Alternatively, the pointing device may vibrate only when the pointer P moves to 4 (that is, when the pointer P escapes from the GUI-component C).

In order to make the user feel the effect that the pointer P moves leftward, the sound output from the left part of the device equipped with a display D or the pointing device may be louder than that output from the right part of the device equipped with a display D or the pointing device, and also the vibration output from the left part of the pointing device may be greater than that output from the right part of the pointing device.

If the pointer P automatically moves to the outside of the GUI-component C and simultaneously the sound is output and the pointing device vibrates, the user feels as if the pointer P automatically moves to the outside of the GUI-component C by antigravity (or repulsive force).

Figure 22:
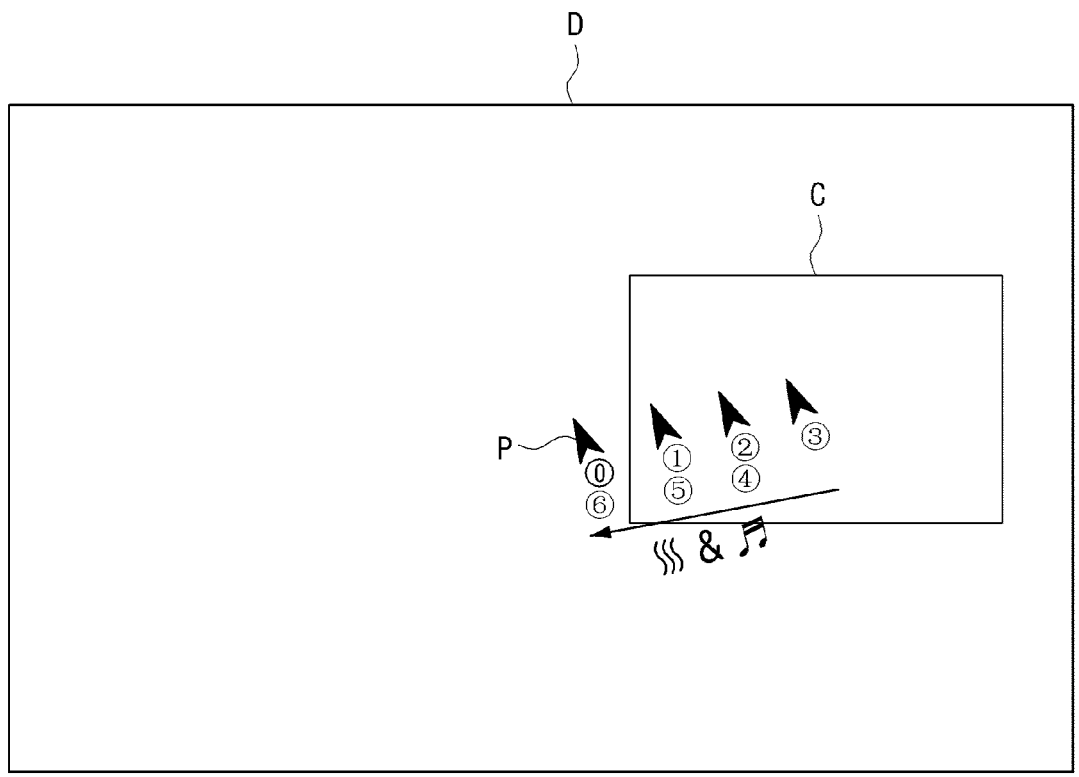

Likewise, if the pointer P is moved in the sequence of 0→1→2→3 by user's manipulation and enters the GUI-component C as shown in FIG. 22, the pointer P automatically moves in the sequence of 3→4→5→6 and simultaneously a sound is output and the pointing device vibrates.

That is, the pointer P is ultimately placed outside the GUI-component C. In this case, the user only moves the pointer P in the sequence of 0→1→2→3. The movement 3→4→5→6 is automatically achieved without user's manipulation.

Accordingly, if the pointer P enters the GUI-component C, the pointer P automatically moves to the outside of the GUI-component C.

If the pointer P automatically moves to the outside of the GUI-component C and simultaneously a sound is output and the pointing device vibrates, the user feels as if the pointer P automatically moves to the outside of the GUI-component C by antigravity.

Figure 23:
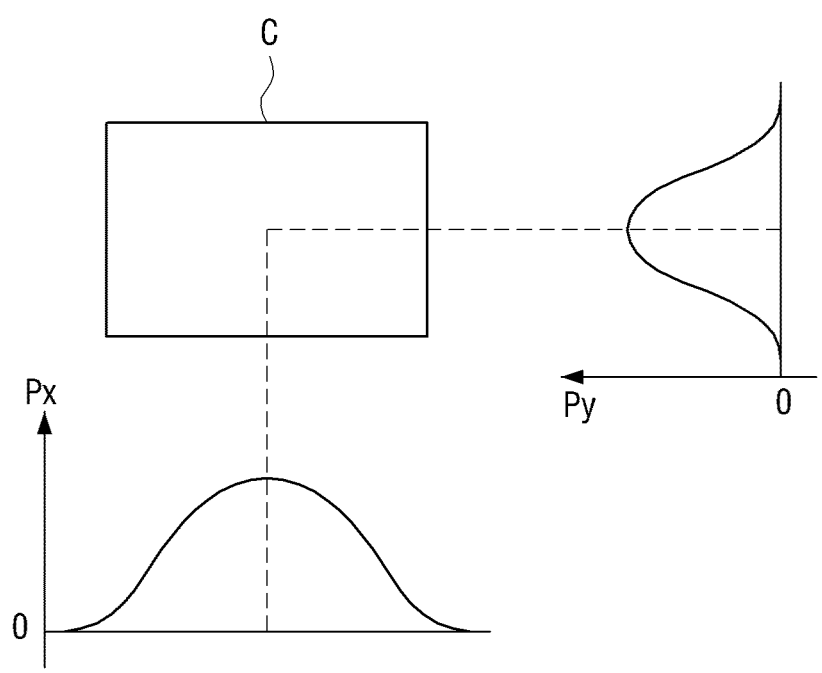
FIG. 23 is a view illustrating potential energy distribution in the GUI-component shown in FIG. 21, according to an exemplary embodiment.

On the assumption that antigravity is exerted from the center of the GUI-component C, the potential energy in/outside the GUI-component C due to the antigravity is distributed as shown in FIG. 23, and the pointer P is moved from a point where the potential energy is high to a point where the potential energy is low.

Referring to FIG. 23, the potential energy inside/outside the GUI-component C is lowest at the outside of the GUI-component C, and the potential energy for both the x-axis and the y-axis is "0". Accordingly, the pointer P ultimately moves to the outside of the GUI-component C where the potential energy is lowest.

The speed of the pointer P which moves to the outside of the GUI-component C is determined according to the distribution of potential energy inside/outside the GUI-component C. However, the moving speed of the pointer P does not necessarily correspond to the potential energy in the GUI-component C. That is, the moving speed of the pointer P which moves to the outside of the GUI-component C may be realized in a linear or a non-linear manner.

It is possible to realize the level of sound and the degree of vibration to be in proportional to the moving speed of the pointer P.

The GUI-component C appearing on the GUI described above has a rectangular shape, which is a closed shape, and pushes the entering pointer P out of the GUI-component C.

The GUI-component C may be applied to an inactivated GUI-component, that is, a GUI-component that cannot be selected by the user with the pointer P. Also, the GUI-component C may be applied to a GUI-component C to which a specific user is prohibited from getting access, such as contents which are not considered suitable for the minors.

Figure 24:
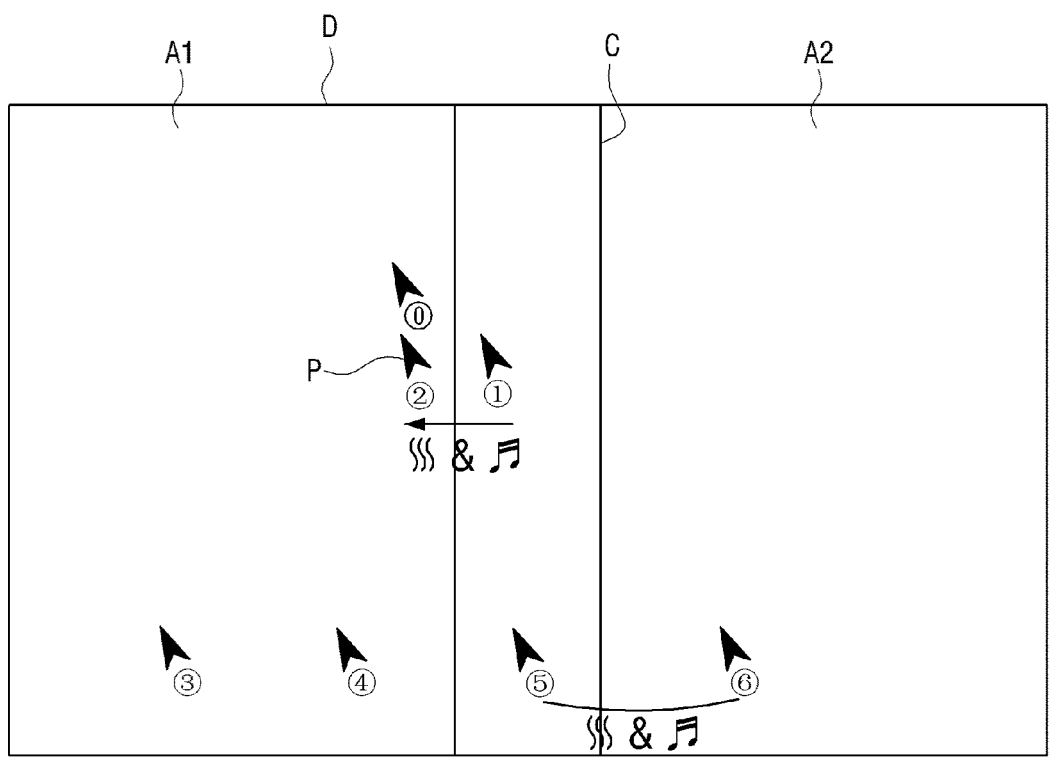
FIG. 24 is a view provided to explain a GUI on which a GUI-component of a straight band type appears, according to an exemplary embodiment.

FIG. 24 illustrates a display D on which a GUI having a GUI-component C of a different type from that of FIG. 21 is displayed. FIG. 24 illustrates the movement of the pointer P when the pointer P enters the GUI-component C by user's manipulation. More specifically, FIG. 24 illustrates a GUI which makes it difficult for the pointer P to move between areas A1 and A2 which are separated by the GUI-component C.

If the pointer P on the upper part of FIG. 24 is moved in the sequence of 0→1 by user's manipulation and enters the GUI-component C, the pointer P automatically moves in the sequence of 1→2, and simultaneously a sound is output and the pointing device vibrates. That is, the pointer P which stays in the area A1 is not moved to the area A2 and still stays in the area A1.

The pointer P on the lower part of FIG. 24 is moved in the sequence of 3→4→5→6 by user's manipulation and ultimately passes through the GUI-component C.

A sound is output while the pointer P moves in the sequence of 5→6. The sound has a pattern different from that of the sound which is output while the pointer moves in the sequence of 1→2.

Also, the pointing device vibrates while the pointer P moves in the sequence of 5→6. The vibration has a pattern different from that of the vibration which is generated while the pointer P moves in the sequence of 1→2.

That is, the pointer P which stays in the area A1 is moved to the area A2.

That is, in the case illustrated on the upper part of FIG. 24, since the degree of the user's manipulation to let the pointer P pass through the GUI-component C is small (the degree of the user's manipulation is less than a threshold), the pointer P does not pass through the GUI-component C. Also, in the case illustrated on the lower part of FIG. 24, since the degree of the user's manipulation to let the pointer P pass through the GUI-component C is great (the degree of the user's manipulation is greater than a threshold), the pointer P passes through the GUI-component C.

If the user encounters the situation of FIG. 24 in manipulating the pointer P, the user feels as if the antigravity is exerted from the center line of the GUI-component C, and makes it difficult to let the pointer P pass through the GUI-component C.

Figure 25:
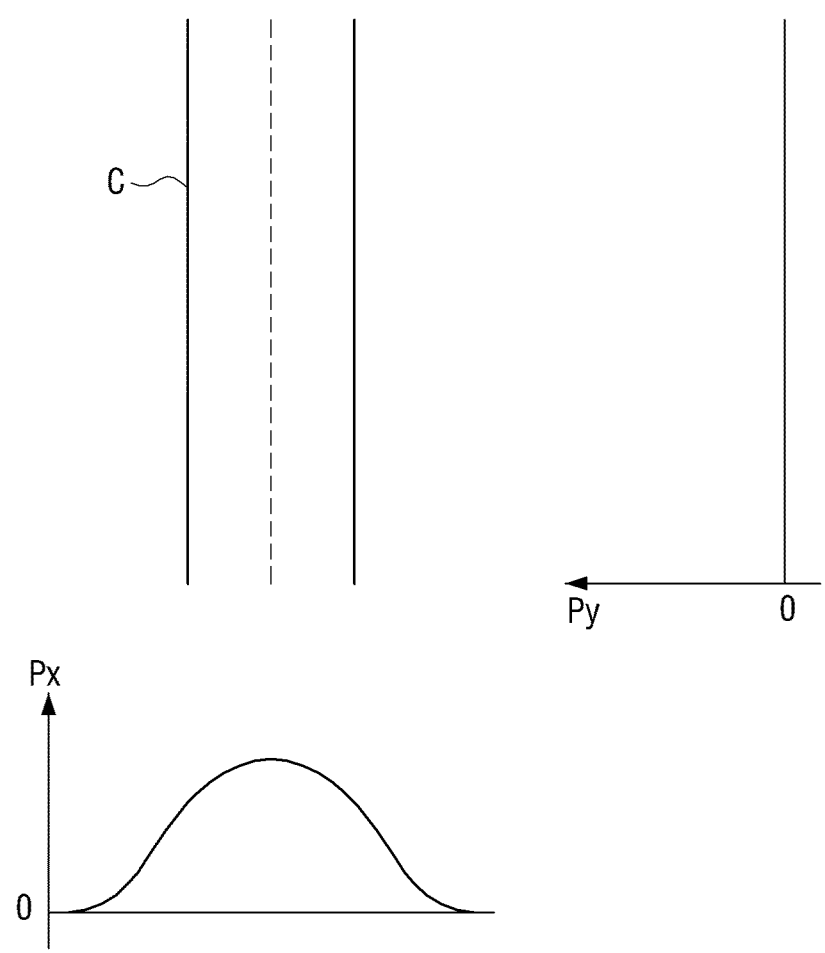
FIG. 25 is a view illustrating potential energy distribution in the GUI-component shown in FIG. 24, according to an exemplary embodiment.

On the assumption that the antigravity is exerted from the center line of the GUI-component C, the potential energy in the GUI-component C due to the antigravity is distributed as shown in FIG. 25 and the pointer P is moved from a point where the potential energy is high and to a point where the potential energy is low.

As shown in FIG. 25, the potential energy with respect to the y-axis in the GUI-component is "0" over all points. Also, the potential energy with respect to the x-axis in the GUI-component C is lowest at the outside of the GUI-component C and is "0". Accordingly, the pointer P ultimately moves to the outside of the GUI-component C where the potential energy is lowest.

The speed of the pointer P which is pushed out when entering the GUI-component C is determined according to the distribution of the potential energy in the GUI-component C. However, the moving speed of the pointer P does not necessary correspond to the distribution of the potential energy in the GUI-component C. That is, the moving speed of the pointer P which is pushed out when entering the GUI-component C may be realized in a linear or non linear manner.

It is possible to realize the level of sound and the degree of vibration to be in proportional to the moving speed of the pointer P.

The GUI-component C described up to now is of a straight band shape and pushes out the pointer P which tries to enter the GUI-component C to separate the areas of the display D.

Figure 26:
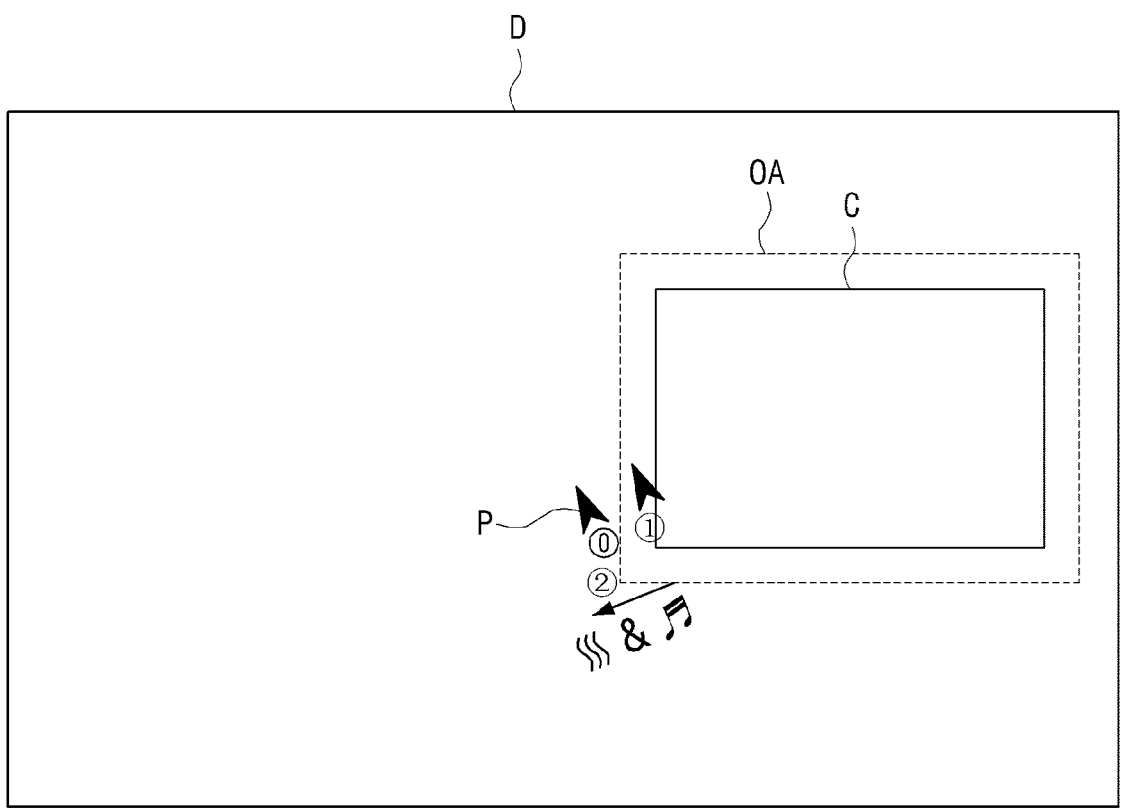
FIG. 26 is a view illustrating a pointer which moves under a different condition from that of FIG. 21, according to an exemplary embodiment.

FIG. 26 illustrates a pointer P which is moved under a different condition from that of FIG. 21. More specifically, in FIG. 26, if the pointer P is moved in the sequence of 0→1 by user's manipulation and enters an outer area OA of a GUI-component C, the pointer P moves in the sequence of 1→2 and simultaneously a sound is output and the pointing device vibrates.

As in FIG. 21, the pointer P of FIG. 26 is ultimately placed outside the GUI-component C. In this case, the user only moves the pointer P in the sequence of 0→1. The movement 1→2 is automatically achieved without user's manipulation.

However, unlike in FIG. 21, in FIG. 26, if the pointer P enters the outer area OA of the GUI-component C, the pointer P automatically moves to the outside of the GUI-component C.

Figure 27:
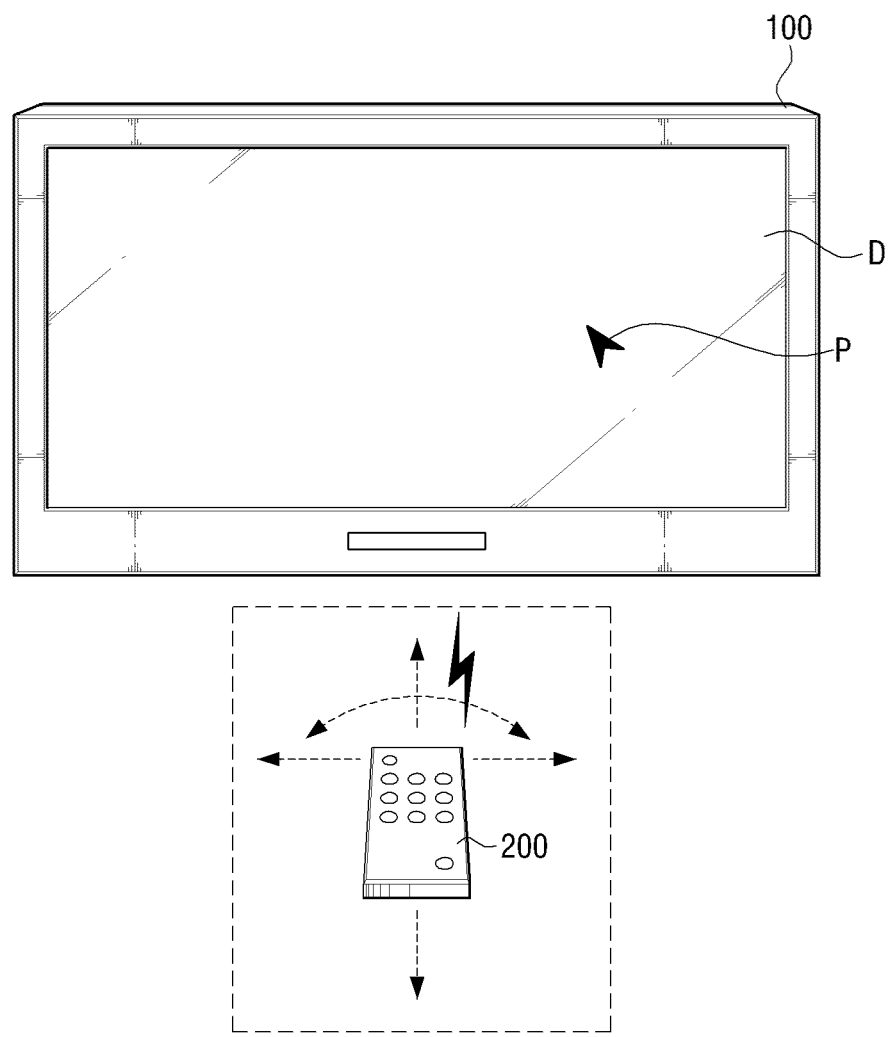
FIGS. 27 to 29 are views illustrating a broadcast receiving system to which the aforementioned GUI can be applied, according to exemplary embodiments.

The GUI described up to now can be applied to a broadcast receiving system and FIG. 27 illustrates a broadcast receiving system to which the above-described GUI can be applied. As shown in FIG. 27, the broadcast receiving system comprises a digital television (DTV) 100 which is a broadcast receiver and a remote controller 200 which is a user-input device.

The DTV 100 provides a broadcast received in a wire or wireless manner to the user through a display D. Also, the DTV 100 provides the user with not only an external input received from an external device connected to the DTV 10 in a wire or wireless manner, but also a file stored in an embedded storage medium or a storage medium connected to the DTV 100.

The remote controller 200 transmits user's manipulation to the DTV 100, and the DTV 100 performs a function corresponding to the user's manipulation. Also, the remote controller may serve as a pointing device, which will be described in detail below.

The front face of the remote controller 200 is movable in the directions indicated by the dotted arrows of FIG. 27 by the user. The front face of the remote controller 200 is movable in an upward direction, a downward direction, a leftward direction, a rightward direction, or in a direction combining the aforementioned directions (e.g., in a north-west direction). That is, the front face of the remote controller 200 is movable in all directions.

Figure 28:
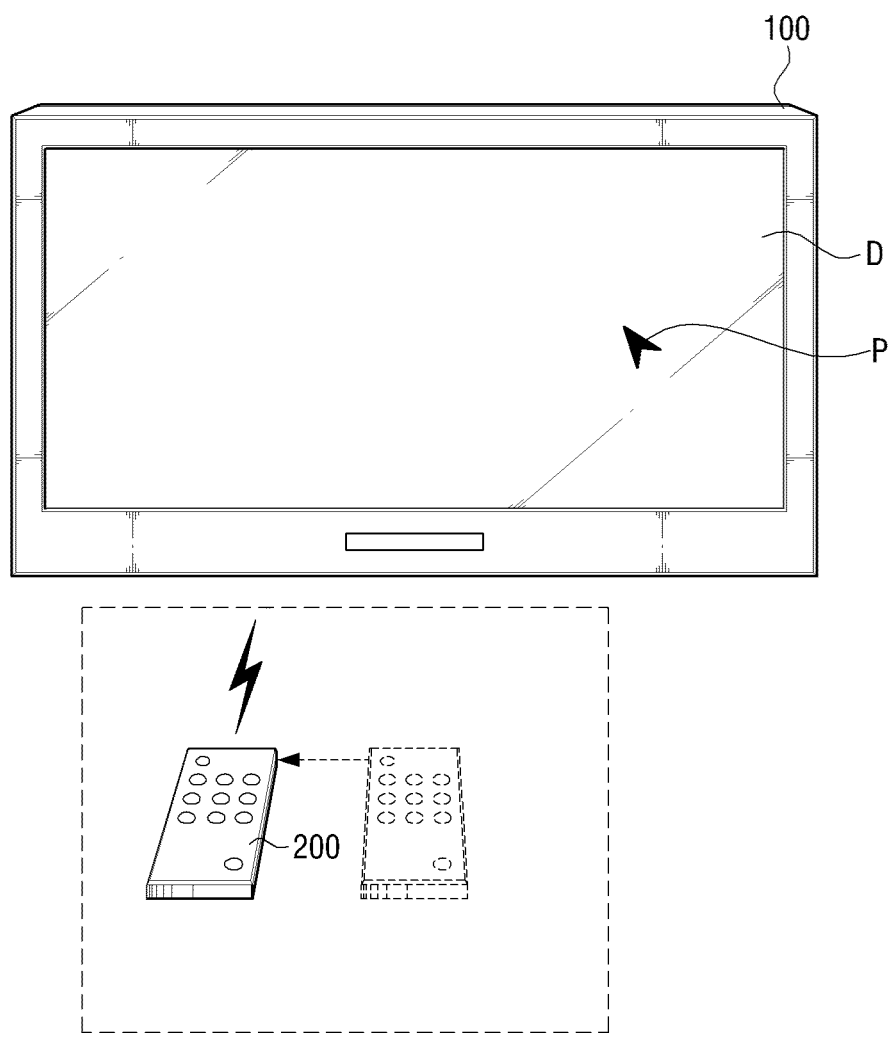

For example, the front face of the remote controller 200 moves while drawing a trajectory on a virtual plane parallel to the screen of the display D. In FIG. 28, the front face of the remote controller 200 is moved in a leftward direction while drawing a trajectory on the virtual plane parallel to the screen of the display D.

The virtual plane is not completely parallel to the screen of the display D and also the virtual plane is not completely planar. This is because, in reality, it is impossible to move the front face of the remote controller 200 on a plane which is completely planar and completely parallel to the screen of the display D.

Therefore, the present invention can be applied to the case where the front face of the remote controller 200 moves on an incomplete plane which is not completely parallel to the screen of the display D.

The user may move the front face of the remote controller 200 by turning only the user's wrist with the arm holding the remote controller being fixed.

Figure 29:
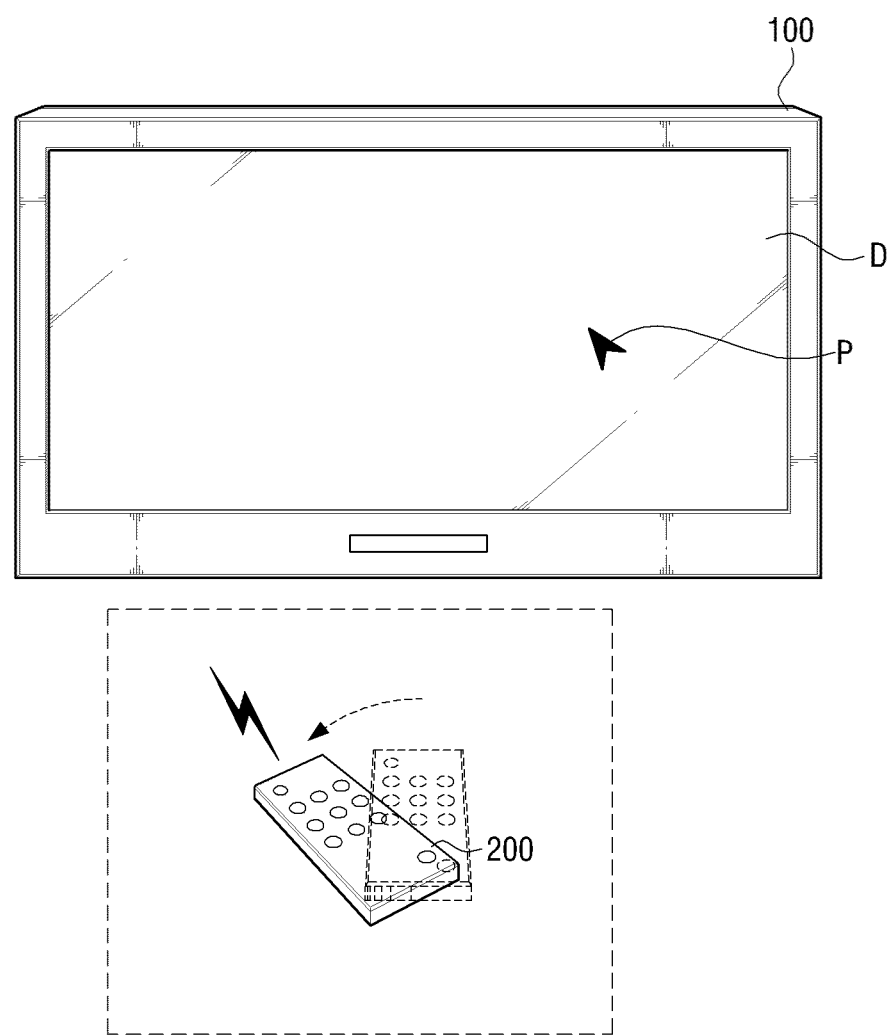

That is, if the user moves the user's wrist upward, downward, leftward, rightward, or in direction combining the aforementioned directions (e.g. in a north-west direction), the front face of the remote controller 200 is moved upward, downward, leftward, rightward, or in a direction combining the aforementioned directions (e.g. in a north-west direction) while drawing a curved trajectory on a virtual hemisphere. In FIG. 29, the front face of the remote controller 200 is moved leftward by the user while drawing a curved trajectory on the virtual hemisphere.

The virtual hemisphere on which the front face of the remote controller 200 is moved by turning the user's wrist may not be a mathematically complete hemisphere. This is because, in reality, it is impossible to move the front face of the remote controller 200 by turning the user's wriest while drawing a trajectory on the mathematically complete hemisphere.

Accordingly, the present invention can be applied to the case where the front face of the remote controller 200 is moved while drawing a curved trajectory on a somewhat incomplete hemisphere rather than a mathematically complete hemisphere.

Briefly, the pointer P displayed on the display D is moved following the movement of the remote controller 200 by the user in the space. The movement of the front face of the remote controller 200 in the space is distinguished from the movement of a PC mouse on a bottom.

If the front face of the remote controller 200 is moved in the space, the pointer P displayed on the display D is moved in the same direction as the direction in which the front face of the remote controller 200 is moved. For example, i) if the user moves the front face of the remote controller 200 upwardly in the space, the pointer P moves upwardly, and ii) if the user moves the front face of the remote controller 200 in the north-west direction in the space, the pointer P moves in the north-west direction.

Accordingly, the remote controller 200 may serve as a pointing device used for moving the pointer P on the display D.

Figure 30:
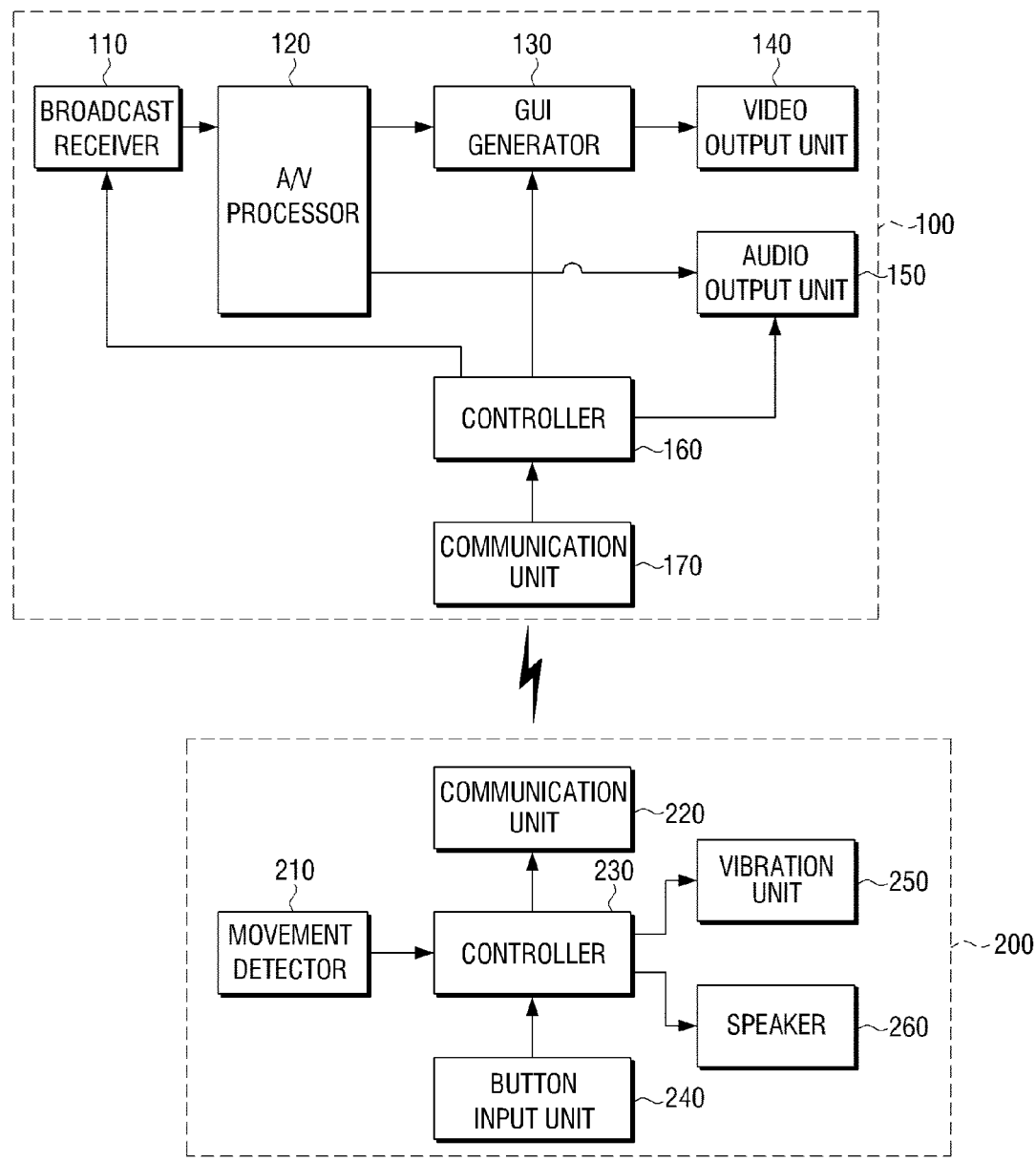
FIG. 30 is a block diagram illustrating a digital television (DTV) and a remote controller which are provided in the broadcast receiving system, according to an exemplary embodiment.

Hereinafter, the DTV 100 and the remote controller 200 will be described with reference to FIG. 30. FIG. 30 is a detailed block diagram illustrating the DTV 100 and the remote controller 200.

As shown in FIG. 30, the remote controller 200 comprises a movement detector 210, a communication unit 220, a controller 230, a button input unit 240, a vibration unit 250, and a speaker 260.

The movement detector 210 detects the movement of the front face of the remote controller 200 by the user, and transmits a result of detection to the controller 230. The movement detector 210 may be a two-dimensional (2D) gyro sensor for example.

The button input unit 240 is provided with a power button, a channel button, a volume button, and a selection button.

The vibration unit 250 comprises vibrating motors to vibrate the remote controller 200. The vibrating motors are disposed on the left part, the right part, the lower part, and the upper part of the remote controller 200 to make the degree of vibration different on each part.

The speaker 260 is an element to output a sound. The speaker 260 is disposed on the left part, the right part, the upper part, and the lower part to make the level of sound different on each part.

The controller 230 transmits information on the movement which is obtained based on the result of detection transmitted from the movement detector 210, such as a moving direction or a moving distance, to the DTV 100 through the communication unit 220. Also, the controller 230 transmits information regarding a button pressed by the user through the button input unit 240 to the DTV 100 through the communication unit 220.

The controller 230 controls the output from the vibration unit 250 and the speaker 260 according to a vibration/sound control command transmitted to the DTV 100 through the communication unit 220.

As shown in FIG. 30, the DTV 100 comprises a broadcast receiver 110, an audio/video (AV) processor 120, a GUI generator 130, a video output unit 140, an audio output unit 150, a controller 160, and a communication unit 170.

The broadcast receiver 110 receives a broadcast from a broadcasting station or a satellite in a wire or wireless manner and tunes to the broadcast.

The A/V processor 120 performs signal-processing such as video decoding, video scaling, and audio decoding with respect to the broadcast output from the broadcast receiver 110. The A/V processor 120 transmits video signals to the GUI-generator 130 and audio signals to the audio output unit 150.

The GUI generator 130 generates the GUI described above and adds the GUI to the image output from the A/V processor 120.

The video output unit 140 displays the image with the GUI which is output from the GUI generator 130 on the display D or outputs the image to an external device (e.g. external TV) connected to the DTV through an external output terminal (not shown).

The audio output unit 150 outputs an audio output from the A/V processor 120 through a speaker or to the external device connected to the DTV through the external output terminal.

The controller 160 grasps a user command based on information on the user' manipulation transmitted from the remote controller 200 through the communication unit 170, such as information on the movement of the front face of the remote controller 200 or on the pressed button, and controls the entire operation of the DTV 100 according to the user command.

In particular, the controller 160 grasps information on the movement of the front face of the remote controller 200 received through the communication unit 170, controls the GUI generator 130 to move the pointer P appearing on the GUI based on the movement information, and transmits a control command to control vibration/sound of the remote controller 200 to the remote controller 200 through the communication unit 170. Detailed description will be provided below with reference to FIG. 31.

FIG. 31 is a flowchart illustrating a method for providing a GUI using a pointer having a visual effect showing that the pointer is moved by gravity.

As shown in FIG. 31, if user's manipulation to move the pointer P is input using the remote controller 200 (S310-Y), the controller 160 controls the GUI generator 130 to move the pointer P according to the user's manipulation (S320).

The user's manipulation to move the pointer P in operation S310 refers to manipulation to move the front face of the remote controller 200. In operation S320, the controller 160 determines a position where the pointer P will be moved based on information on the movement of the front face of the remote controller 200 received from the communication unit 170, and controls the GUI generator 130 to move the pointer P to the determined position.

If the pointer P is placed in an activated GUI-component C as a result of movement (S330-Y), the controller 160 controls the GUI-generator 130 to move the pointer P toward the center (line) of the activated GUI-component C, and controls a corresponding sound and vibration to be output through the remote controller 200 (S340).

The activated GUI-component C recited herein refers to the GUI-component C shown in FIG. 1, 8, or 11. If the activated GUI-component C is the GUI component shown in FIG. 1, the pointer P moves toward the center of the GUI-component C and the remote controller 200 vibrates and outputs a sound in operation S340. If the activated GUI-component C is the GUI-component C shown in FIG. 8 or 11, the pointer P moves toward the center line of the GUI-component C, and the remote controller 200 vibrates and outputs a sound in operation S340.

After that, if user's manipulation to enable the pointer P to escape from the GUI-component C is input using the remote controller 200 (S350-Y), the controller 160 controls the GUI generator 130 to move the pointer P outside the GUI-component C, and controls corresponding vibration and sound to be output through the remote controller 200 (S360).

The user's manipulation to enable the pointer P to escape from the GUI-component C refers to user's manipulation to move the pointer P in the sequence of 0→1→2→3 as shown in FIG. 3. That is, in this case, the degree of user's manipulation to move the pointer P outside the GUI-component C is greater than a threshold.

After that, the controller 160 controls the GUI generator 130 to move the pointer P to another GUI-component, and controls corresponding vibration and sound to be output through the remote controller 200 (S370). The operation S370 corresponds to the process shown in FIG. 16 or 17. The operation S370 may be omitted if necessary.

On the other hand, if the user's manipulation to enable the pointer P to escape from the GUI-component C is not input using the remote controller 200 (S350-N), the controller 160 controls the GUI generator 130 to move the pointer P toward the center (line) of the GUI-component C, and controls corresponding vibration and sound to be output through the remote controller 200 (S340). This operation corresponds to the process shown FIG. 2 or 8.

If the pointer P is placed in an inactivated GUI-component C as a result of movement in operation S320 (S330-N & 5380-Y), the controller 160 controls the GUI generator 140 to move the pointer P outside the inactivated GUI-component C, and controls corresponding vibration and sound to be output through the remote controller 200 (S390).

The inactivated GUI-component C refers to the GUI component C shown in FIG. 21 and the GUI-component C shown in FIG. 24.

After that, if user's manipulation to enable the pointer P to pass through the GUI-component C is input using the remote controller 200 (S400-Y), the controller 160 controls the GUI generator 130 to let the pointer P pass through the GUI-component C and controls corresponding vibration and sound to be output through the remote controller 200 (S410).

The user's manipulation to enable the pointer P to pass through the GUI-component C refers to user's manipulation to move the pointer P in the sequence of 3→4→5→6 as shown on the lower part of FIG. 24. That is, in this case, the degree of user's manipulation to let the pointer P pass through the GUI-component C is greater than a threshold.

On the other hand, if the user's manipulation to enable the pointer P to pass through the GUI-component C is not input using the remote controller 200 (S400-N), the controller 160 controls the GUI generator 130 to move the pointer P outside the inactivated GUI-component C, and controls corresponding vibration and sound to be output through the remote controller 200 (S390). This operation corresponds to the process illustrated in FIG. 21, 22 or the upper part of FIG. 24.

If the pointer P is neither placed in the activated GUI component C nor the inactivated GUI component C as a result of movement in operation S320 (S330-N or S380-N), the pointer P does not automatically move and operation S310 resumes. For example, if the pointer P is placed on the background portion of the GUI, the pointer P is moved only according to user's manipulation.

Up to now, exemplary embodiments have been described in detail.

In the above exemplary embodiments, the sound is output through the remote controller 200 when the pointer automatically moves.

However, this is merely an example. The sound may be output through the DTV 100 rather than the remote controller 200 when the pointer automatically moves as described above.

Also, in the above exemplary embodiments, when the pointer P automatically moves, both the sound which provides an auditory effect perceivable by the user and the vibration which provides a tactile effect perceivable by the user are output. However, this is merely an example. Only one of the sound and the vibration may be output.

In this embodiment, the GUI-component is of a rectangular or band shape, but this is merely an example. The GUI-component may be realized in any other shape.

Also, the pointer P is set to automatically move toward the center line of the band in FIGS. 8 and 11. However, the pointer P may be set to automatically move in the center area rather than the center line. The concept and detailed description thereof is omitted because it can be inferred from the description of FIGS. 19 and 20.

Likewise, in FIG. 24, the pointer P may be realized such that the areas are separated by the center area rather than the center line.

If the user's manipulation to move the pointer P toward the center of the GUI-component C is added at the time that the pointer P enters the GUI-component C, and automatically moves toward the center of the GUI-component C, it is possible to set the speed of the pointer P which moves toward the center of the GUI-component C to increase.

On the other hand, when the pointer P enters the GUI-component C and automatically moves toward the center of the GUI-component C, if user's manipulation to let the pointer P escape from the center of the GUI-component C is added but if the degree of the user's manipulation is small (that is, less than a threshold), it is possible to set the speed of the pointer P which moves toward the GUI-component C to decrease.

On the other hand, when the pointer P enters the GUI-component and automatically moves toward the center of the GUI-component, if user's manipulation to let the pointer escape from the center of the GUI-component C is added and the degree of the user's manipulation is great (that is, greater than a threshold), the pointer P may move outside the GUI-component C according to the user's manipulation.

Likewise, when the pointer P is pushed out of the GUI-component C, if user's manipulation to move the pointer P outside the GUI-component C is added, it is possible to set the speed of the pointer P which is pushed out of the GUI-component C to increase.

Also, when the pointer P is pushed out of the GUI-component C, if user's manipulation to prevent the pointer P from being pushed out of the GUI-component is added but the degree of the user's manipulation is small (that is, less than a threshold), it is possible to set the speed of the pointer P which is pushed out of the GUI-component C to decrease.

If the pointer P is placed on a position where the GUI-component C does not appear, the GUI described up to now moves the pointer P according to the user's manipulation, but if the pointer P is placed on the area except for the GUI-component C, the GUI automatically moves the pointer P to another position different from the current position.

In the latter case, the pointer P is set to have a visual effect showing that the pointer P is moved by gravity. However, since the gravity is merely an example of a force having the visual effect showing that the gravity is exerted to the pointer P, another force may be used in place of the gravity. Magnetic force and electric force may be used as a force having such a visual effect.

Also, in the above exemplary embodiments, an additional process is performed depending on whether the pointer enters the GUI-component C or not, but this is merely an example for the convenience of explanation. If it is satisfied that the pointer P is moved according to only the user's manipulation or is automatically moved based on the position of the pointer P, the technical idea of the present invention can be applied to other cases different from the above case.

Although a DTV is explained as a broadcast receiving apparatus in the above embodiment, the present invention can be applied to any other broadcast receiving apparatus besides the DTV. The broadcast receiving apparatus may include a set-top box (STB), a digital multimedia broadcast (DMB) receiving apparatus, and a portable device having a broadcast receiving module embedded therein for performing a broadcast receiving function (e.g. a mobile phone having a DMB receiving module embedded therein). In the case of a portable device, it is possible to use a touch pad in place of a remote controller to move the pointer P.

The present invention can be applied to any electronic apparatus that can provide a GUI through a display. The remote controller to move the pointer P is replaceable with a touch pad, a mouse, or a button input device according to the type of electronic apparatus.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing a graphical user interface (GUI), the method comprising:
displaying a GUI component and a pointer configured to be controlled by a pointing device and used for indicating one point of a screen including the GUI component;
if the pointer enters the GUI-component, automatically moving the pointer toward a first position of the GUI-component at a speed which varies as the pointer approaches the first position; and
outputting at least one of an auditory effect and a tactile effect from different parts of the pointing device at different levels corresponding to the different parts.

2. The method as claimed in claim 1,
wherein while the pointer is moved toward the first position of the GUI-component, the different levels of the at least one of the auditory effect and the tactile effect are changed.

3. The method as claimed in claim 2, wherein the at least one of the auditory effect and the tactile effect is output at at least one point of a time when the pointer enters the GUI-component and a time when the pointer reaches the first position.

4. The method as claimed in claim 2, wherein the different levels of the at least one of the auditory effect and the tactile effect are determined according to a direction in which the pointer moves.

5. The method as claimed in claim 4, wherein the pointing device has a plurality of side parts, and
if the pointer enters to the GUI-component along a first direction, a level of the at least one of the auditory effect and the tactile effect output from a first part corresponding to the first direction among the plurality of side parts of the pointing device is greater than a level of the at least one of the auditory effect and the tactile effect output from a second part of the pointing device which is positioned opposite to the first part in the pointing device.

6. The method as claimed in claim 2,
wherein the different levels of the at least one of the auditory effect and the tactile effect are changed according to the moving speed of the pointer.

7. The method as claimed in claim 2, further comprising:
determining whether an escape operation to let the pointer escape from the GUI-component is input;
if it is determined that the escape operation is input, determining a degree of the escape operation;
if the degree of the escape operation is greater than a threshold, letting the pointer move to an outside of the GUI-component; and
outputting at least one of another auditory effect and another tactile effect while the pointer moves toward a second position in a display.

8. The method as claimed in claim 7, wherein a pattern for the at least one of the auditory effect and the tactile effect is different from a pattern for the at least one of the other auditory effect and the other tactile effect.

9. The method as claimed in claim 2, further comprising:
if the pointer escapes from the GUI-component, moving the pointer to another GUI-component; and
outputting at least one of another auditory effect and another tactile effect while the pointer is moved toward the other GUI-component.

10. A method for providing a graphical user interface (GUI), the method comprising:
displaying a GUI-component and a pointer configured to be controlled by a pointing device and used for indicating one point of a screen including the GUI-component;
if the pointer enters the GUI-component, automatically moving the pointer to an outside of the GUI-component at a speed which varies as the pointer approaches the outside of the GUI-component; and
outputting at least one of an auditory effect and a tactile effect from different parts of the pointing device at different levels corresponding to the different parts.

11. The method as claimed in claim 10, wherein while the pointer is moved to the outside of the GUI-component, the different levels of the at least one of the auditory effect and the tactile effect are changed.

12. The method as claimed in claim 11, wherein the at least one of the auditory effect and the tactile effect is output at at least one point of a time when the pointer enters the GUI-component and a time when the pointer completely escapes from the GUI-component.

13. The method as claimed in claim 11, wherein the different levels of the at least one of the auditory effect and the tactile effect are determined according to a direction in which the pointer moves.

14. The method as claimed in claim 13, wherein the pointing device has a plurality of side parts, and if the pointer enters to the GUI-component along a first direction, a level of the at least one of the auditory effect and the tactile effect output from a first part corresponding to the first direction among the plurality of side parts of the pointing device is greater than a level of the at least one of the auditory effect and the tactile effect output from a second part of the pointing device which is positioned opposite to the first part in the pointing device.

15. The method as claimed in claim 11, wherein the different levels of the at least one of the auditory effect and the tactile effect are changed according to the moving speed of the pointer.

16. The method as claimed in claim 11, further comprising:
determining whether a pass operation to let the pointer pass through the GUI-component is input;
if it is determined that the pass operation is input, determining a degree of the pass operation;
if the degree of the pass operation is greater than a threshold, letting the pointer pass through the GUI-component; and
outputting at least one of another auditory effect and another tactile effect while the pointer passes through the GUI-component.

17. The method as claimed in claim 16, wherein a pattern for the at least one of the auditory effect and the tactile effect is different from a pattern for the at least one of the other auditory effect and the other tactile effect.

18. A method for providing a graphical user interface (GUI), the method comprising:
determining a position of a pointer configured to be controlled by a pointing device;
if the pointer is determined to be placed at a first area, moving the pointer according to a user's manipulation of the pointing device;
if the pointer is determined to be placed on a second area, automatically moving the pointer to another position at a speed which varies as the pointer approaches the other position; and outputting at least one of an auditory effect and a tactile effect from different parts of the pointing device at different levels corresponding to the different parts.

19. The method as claimed in claim 18, wherein the pointer is moved to the other position with a visual effect that the pointer is moved by a force, wherein the force includes at least one of gravity, a magnetic force, and an electric force.

20. A method for providing a graphical user interface (GUI), the method comprising:

displaying a GUI-component and a pointer configured to be controlled by a pointing device and used for indicating one point of a screen including the GUI-component;

if the pointer enters an area which is substantially close to the GUI component, automatically moving the pointer toward a designated position at a speed which varies as the pointer approaches the designated position; and outputting at least one of an auditory effect and a tactile effect from different parts of the pointing device at different levels corresponding to the different parts.

21. A method for providing a GUI, the method comprising:

displaying a GUI-component and a pointer configured to be controlled by a pointing device and used for indicating one point of a screen including the GUI-component;

if the pointer enters the GUI-component, automatically moving the pointer at a speed which varies regardless of a user's intention; and outputting at least one of an auditory effect and a tactile effect from different parts of the pointing device at different levels corresponding to the different parts.

22. An electronic apparatus, comprising:

a graphical user interface (GUI) generator which generates a GUI on which a GUI-component and a pointer configured to be controlled by a pointing device and used for indicating one point of a screen including the GUI-component are displayed; and a controller which controls the GUI generator to move the pointer toward a designated position of the GUI-component at a speed which varies if the pointer enters the GUI-component and controls the pointing device to output at least one of an auditory effect and a tactile effect from different parts of the pointing device at different levels corresponding to the different parts.

23. The electronic apparatus as claimed in claim 22, wherein the pointing device comprises a remote controller for the electronic apparatus.

24. An electronic apparatus, comprising:

a graphical user interface (GUI) generator which generates a GUI on which a GUI-component and a pointer configured to be controlled by a pointing device and used for indicating one point of a screen including the GUI-component are displayed; and a controller which controls the GUI generator to move the pointer to an outside of the GUI-component at a speed which varies if the pointer enters the GUI-component and controls the pointing device to output at least one of an auditory effect and a tactile effect from different parts of the pointing device at different levels corresponding to the different parts.

25. The electronic apparatus as claimed in claim 24, wherein the pointing device comprises a remote controller for the electronic apparatus.

* * * * *